US012704805B2

(12) United States Patent
Horiuchi

(10) Patent No.: US 12,704,805 B2
(45) Date of Patent: Aug. 11, 2026

(54) IMAGE FORMING APPARATUS FOR ACCOMODATING COMPONENT FIT

(71) Applicant: CANON KABUSHIKI KAISHA, Tokyo (JP)

(72) Inventor: Sho Horiuchi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 18/903,569

(22) Filed: Oct. 1, 2024

(65) Prior Publication Data

US 2025/0110441 A1 Apr. 3, 2025

(30) Foreign Application Priority Data

Oct. 3, 2023 (JP) ................................ 2023-172274

(51) Int. Cl.
*G03G 15/00* (2006.01)

(52) U.S. Cl.
CPC .................................. *G03G 15/80* (2013.01)

(58) Field of Classification Search
USPC ........................................................... 399/90
See application file for complete search history.

(56) References Cited

U.S. PATENT DOCUMENTS 5,940,116 A * 8/1999 Park .................. G03G 21/1652
347/152
2021/0278801 A1* 9/2021 Ishii .................. G03G 21/1652

FOREIGN PATENT DOCUMENTS

JP 2022126270 A 8/2022

* cited by examiner

*Primary Examiner* — Quana Grainger
(74) *Attorney, Agent, or Firm* — Canon U.S.A., Inc. IP Division

(57) ABSTRACT

An image forming apparatus for forming an image on a recording material, that includes a first casing and a second casing that are attachable to and detachable from each other, a first connector unit including a first terminal portion and a first support portion, and a second connector unit including a second support portion and a second terminal portion electrically connected with the first terminal portion by being engaged with the first terminal portion. The first support portion is movable relative to the first casing. The first terminal portion is fixed to the first support portion. The second support portion is fixed to the second casing. The second terminal portion is movable relative to the second support portion. A movable range of the first support portion relative to the first casing is larger than a movable range of the second terminal portion relative to the second support portion.

19 Claims, 14 Drawing Sheets

IMAGE FORMING APPARATUS FOR ACCOMODATING COMPONENT FIT

BACKGROUND

Field

The present disclosure relates to an image forming apparatus including an external unit attachable to and detachable from an apparatus main body.

Description of the Related Art

There have been conventionally proposed image forming apparatuses including an apparatus main body and an external unit attachable to and detachable from the apparatus main body.

Not only the respective casings of the apparatus main body and the external unit are physically connected, but also the apparatus main body and the external unit are electrically connected via connectors each having a connection terminal (Japanese Patent Application Laid-Open No. 2022-126270). In the apparatus discussed in Japanese Patent Application Laid-Open No. 2022-126270, one connector is provided movably relative to a different connector in such a manner as to position the connector of the apparatus main body and the connector of the external unit within a range in which the connectors can fit with each other, when the apparatus main body and the external unit are attached together.

SUMMARY

According to some embodiments, an image forming apparatus is configured to form an image on a recording material. The image forming apparatus includes a first casing and a second casing that are attachable to and detachable from each other, a first connector unit including a first terminal portion and a first support portion configured to support the first terminal portion, and a second connector unit including a second terminal portion electrically connected with the first terminal portion by being fitted with the first terminal portion in a first direction, and a second support portion configured to support the second terminal portion. The first support portion is movable relative to the first casing. The first terminal portion is fixed to the first support portion. The second support portion is fixed to the second casing. The second terminal portion is movable relative to the second support portion. A movable range of the first support portion relative to the first casing is larger than a movable range of the second terminal portion relative to the second support portion.

According to another embodiment, an image forming apparatus is configured to form an image on a recording material. The image forming apparatus includes a first casing and a second casing that are attachable to and detachable from each other, a first connector unit including a first terminal portion and a first support portion configured to support the first terminal portion, and a second connector unit including a second terminal portion electrically connected with the first terminal portion by being fitted with the first terminal portion in a first direction, and a second support portion configured to support the second terminal portion. The first support portion is movable relative to the first casing in a second direction intersecting with the first direction. The first terminal portion is movable relative to the first support portion in the second direction. The second support portion is fixed to the second casing. The second terminal portion is fixed to the second support portion. A movable range in the second direction of the first support portion relative to the first casing is larger than a movable range in the second direction of the first terminal portion relative to the first support portion.

Further features of the present disclosure will become apparent from the following description of exemplary embodiments with reference to the attached drawings.

DESCRIPTION OF THE EMBODIMENTS

<Image Forming Apparatus>

We have found that it is sometimes difficult to position a connector of an apparatus main body and a connector of an external unit at positions where these can fit with each other when the apparatus main body and the external unit are attached.

According to various exemplary embodiments, features, and aspects of the present disclosure, and the accompanying drawings, there is provided an image forming apparatus that can easily position a connector of an apparatus main body and a connector of an external unit at positions where these can fit with each other when the apparatus main body and the external unit are attached.

Figure 1:
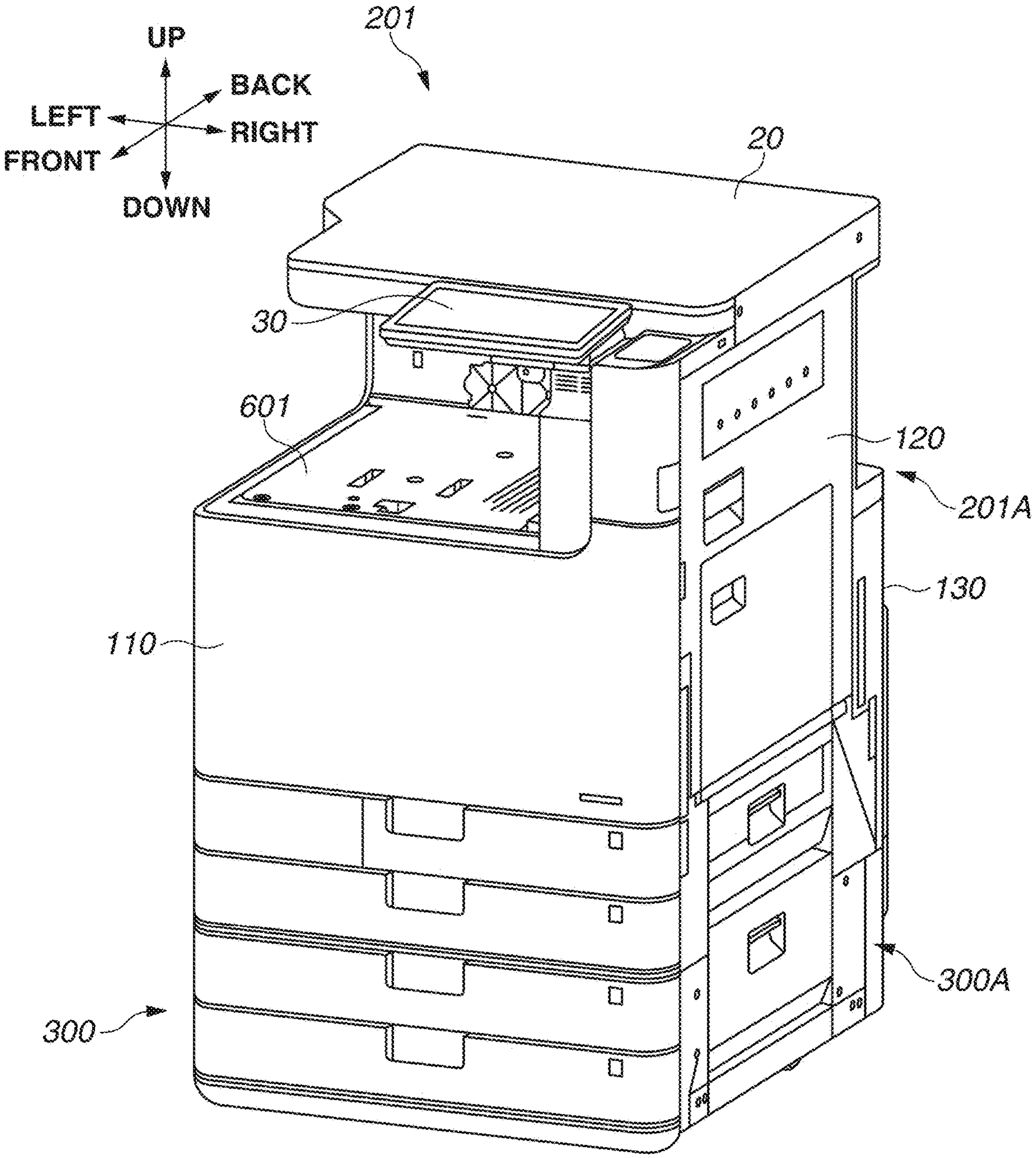
FIG. 1 is a perspective view illustrating an image forming apparatus according to an exemplary embodiment.

Hereinafter, a first exemplary embodiment will be described. First of all, an image forming apparatus according to the present exemplary embodiment will be described with reference to FIGS. 1 and 2. As illustrated in FIG. 1, an image forming apparatus 201 according to the present exemplary embodiment is a so-called in-body discharge type image forming apparatus. The image forming apparatus 201 includes a casing 201A, and a document reading device 20 that reads image information of a document. Between the casing 201A and the document reading device 20, a discharge tray 601 on which sheets discharged from the casing 201A is formed. On the front side of the casing 201A, an operation unit 30 is provided. The operation unit 30 includes a display unit that can display various types of information, and keys with which a user can enter various types of information in accordance with a user operation.

Hereinafter, the side on which a user stands when operating the operation unit 30 to operate the image forming apparatus 201 is referred to as a "front side (front)", and an opposite side thereof is referred to as a "back side (back)". The left side of the image forming apparatus 201 as viewed from the front is referred to as "left", and the right side of the image forming apparatus 201 as viewed from the front is referred to as "right".

The casing 201A includes a front side plate provided on the front side of the image forming apparatus 201, a back side plate that is provided on the back side and supports each unit together with the front side plate, a stay that couples the front side plate and the back side plate, a supporting column that supports the front side plate, and a plurality of plate members, such as a bottom portion. The casing 201A is covered with an outer cover that constitutes the exterior of the image forming apparatus 201. As the outer cover, a front cover 110 is arranged on the front side, side covers 120 are arranged on both the left and right side surfaces, and a back cover 130 is arranged on the back side.

The image forming apparatus 201 according to the present exemplary embodiment includes a sheet storage device 300 provided below the casing 201A serving as a second casing. The sheet storage device 300 is an example of an external unit attachable to and detachable from the image forming apparatus 201. The casing 201A is provided attachably to and detachably from a casing 300A of the sheet storage device 300. The sheet storage device 300 is retrofitted to supply a large number of sheets with various sizes and different types that are stored in the casing 300A serving as a first casing, to the image forming apparatus 201. The casing 201A and the casing 300A are provided in such a manner as to be physically connectable, and the image forming apparatus 201 and the sheet storage device 300 are coupled via the casing 201A and the casing 300A.

Figure 2:
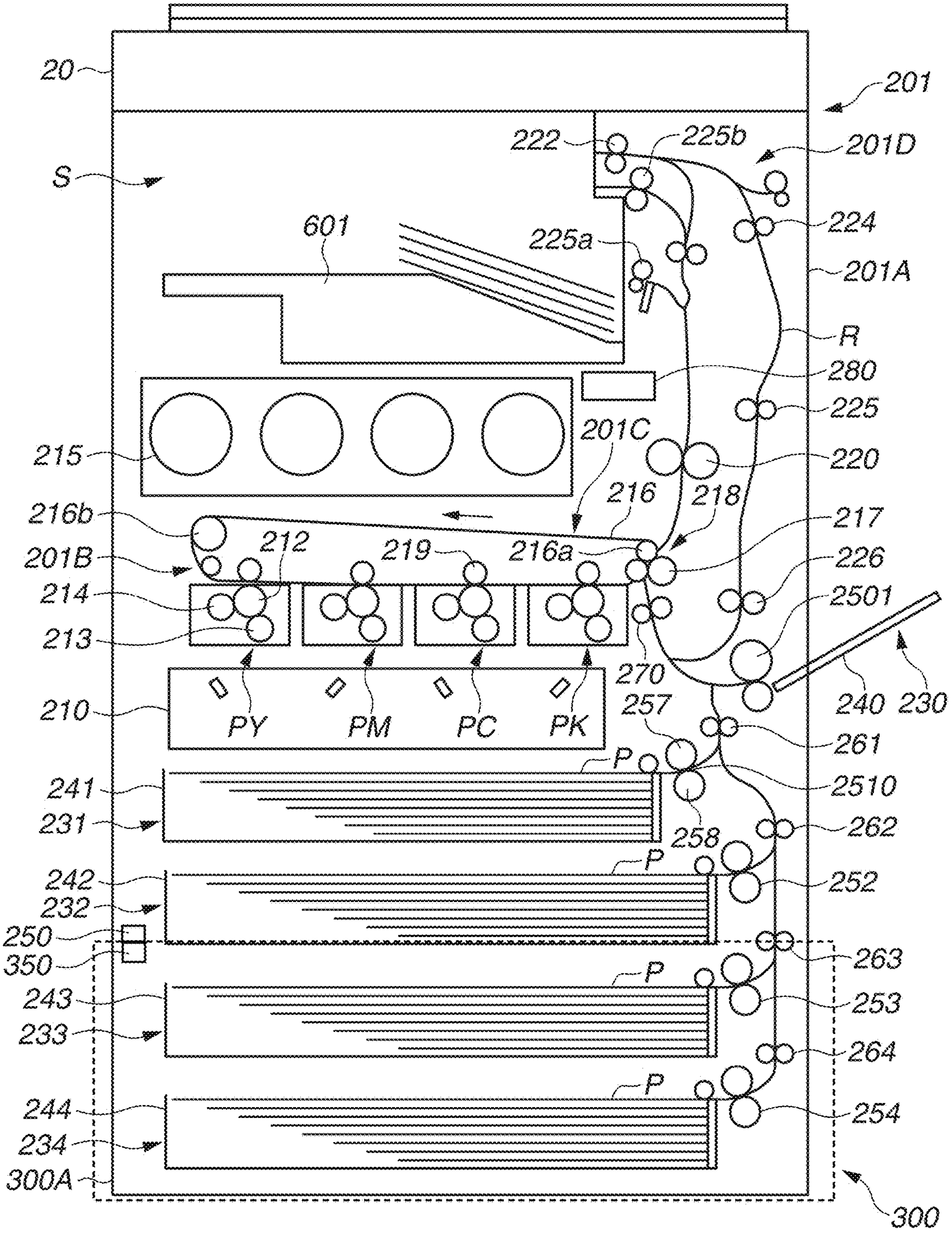
FIG. 2 is a schematic diagram illustrating a configuration of an image forming apparatus to which a sheet storage device is attached.

Next, a schematic configuration of the image forming apparatus 201 will be described with reference to FIG. 2. As illustrated in FIG. 2, the image forming apparatus 201 includes an image forming unit 201B that forms a toner image on a sheet P. The image forming unit 201B is an electrophotographic unit of an intermediate transfer system.

The image forming unit 201B includes a laser scanner 210, and four process cartridges PY, PM, PC, and PK that form toner images with four colors including yellow (Y), magenta (M), cyan (C), and black (K). Each of the process cartridges PY to PK includes a photosensitive drum 212, a charging device 213, and a development device 214. The image forming unit 201B also includes an intermediate transfer unit 201C arranged above the process cartridges PY to PK, and a fixing unit 220. Above the intermediate transfer unit 201C, a toner cartridge 215 for supplying toner to each of the development devices 214 is attached.

The intermediate transfer unit 201C includes an intermediate transfer belt 216 wound around a drive roller 216*a* and a tension roller 216*b*. Inside the intermediate transfer belt 216, primary transfer rollers 219 that contact the intermediate transfer belt 216 at positions facing the respective photosensitive drums 212 are provided. The intermediate transfer belt 216 is rotated counterclockwise by the drive roller 216*a* driven by a drive unit (not illustrated).

A secondary transfer roller 217 for transferring a toner image borne on the intermediate transfer belt 216 onto the sheet P is provided at a position of the intermediate transfer unit 201C that faces the drive roller 216*a*. The fixing unit 220 is provided above the secondary transfer roller 217, and a first discharge roller pair 225*a*, a second discharge roller pair 225*b*, and a duplex reversing unit 201D are arranged above the fixing unit 220. The duplex reversing unit 201D is provided with a reversing roller pair 222 that can reverse rotation and a re-conveyance path R that re-conveys a sheet with an image formed on one surface thereof to the image forming unit 201B.

An image forming operation of the image forming unit 201B will now be described. An image on a document is read by the document reading device 20, image-processed by a control unit (not illustrated), then converted into an electric signal, and the electric signal is transmitted to the laser scanner 210 of the image forming unit 201B. In the image forming unit 201B, the photosensitive drum 212 with its surface uniformly charged to a potential of a predetermined polarity by the charging device 213 is irradiated with laser light from the laser scanner 210, and the surface of the rotating photosensitive drum 212 is exposed. Electrostatic latent images corresponding to yellow, magenta, cyan, and black images are accordingly formed on the surfaces of the photosensitive drums 212 of the respective process cartridges PY to PK. Each of these electrostatic latent images is visualized by being developed with each color toner supplied from the development device 214, and then primarily transferred from the photosensitive drum 212 onto the intermediate transfer belt 216 by a primary transfer voltage applied by the primary transfer roller 219.

The image forming apparatus 201 includes a first sheet feeding unit 231 and a second sheet feeding unit 232. The first sheet feeding unit 231 includes a first cassette 241 for storing the sheet P, and a first feed roller pair 2510 and a first drawing roller pair 261 that feed the sheet P stored in the first cassette 241. The second sheet feeding unit 232 includes a second cassette 242 for storing the sheet P, and a second feed roller pair 252 and a second drawing roller pair 262 that feed the sheet P stored in the second cassette 242.

In a case where the sheet storage device 300 is attached, the sheet P is fed to the image forming apparatus 201 from the sheet storage device 300. The sheet storage device 300 includes a third sheet feeding unit 233 and a fourth sheet feeding unit 234. The third sheet feeding unit 233 includes a third cassette 243 for storing the sheet P, and a third feed roller pair 253 and a third drawing roller pair 263 that feed the sheet P stored in the third cassette 243. The fourth sheet feeding unit 234 includes a fourth cassette 244 for storing the sheet P, and a fourth feed roller pair 254 and fourth drawing roller pair 264 that feed the sheet P stored in the fourth cassette 244.

The sheet storage device 300 receives power supply from a power unit 280 provided in the casing 201A, receives an electric signal for control (hereinafter, referred to as a control signal) from a control unit provided in the casing 201A, and performs an operation of supplying the sheet P to the image forming apparatus 201. The power unit 280 is electrically connected with a commercial power source via an outlet and power cord (not illustrated), and is used also to supply power to the sheet storage device 300 in addition to being used to supply power of the commercial power source to each unit provided in the casing 201A.

The first and second cassettes 241 and 242 can store the sheets P, and can be inserted and drawn with respect to the casing 201A of the image forming apparatus 201. The third and fourth cassettes 243 and 244 serving as a storage member can store the sheets P, and can be inserted and drawn with respect to the casing 300A of the sheet storage device 300. As the sheet P serving as a recording material, paper such as plain paper and thick paper, a plastic film such as a sheet for an overhead projector, cloth, a surface-processed sheet material such as coated paper, and a specially shaped sheet material such as an envelope and index paper can be used.

The first to fourth feed roller pairs 2510 and 252 to 254 each include a feed roller 257 that feeds the sheet P from a corresponding one of the first to fourth cassettes 241 to 244, and a retard roller 258 that has contact with the feed roller 257. Drive force in a direction against the rotation of the feed roller 257 is input to the retard roller 258 via, for example, a torque limiter. By applying frictional force to the sheet P that has entered a separation nip between the retard roller 258 and the feed roller 257, the retard roller 258 separate the sheet P conveyed by the feed roller 257 from other sheets. In this manner, each of the first to fourth feed roller pairs 2510 and 252 to 254 is configured to feed, one by one, the sheets P in a corresponding one of the first to fourth cassettes 241 to 244.

The sheets P fed by the first to fourth feed roller pairs 2510 and 252 to 254 from the first to fourth cassettes 241 to 244 are conveyed toward a registration roller pair 270 via the first to fourth drawing roller pairs 261 to 264 serving as conveyance roller pairs that convey sheets. At this time, the sheets P fed from the second to fourth cassettes 242 to 244 other than the uppermost first cassette 241 are conveyed upward toward the registration roller pair 270 by being delivered to the first to third drawing roller pairs 261 to 263 corresponding to the upper cassettes. For example, the sheet P fed from the third sheet feeding unit 233 included in the sheet storage device 300 is fed by the third feed roller pair 253 from the third cassette 243, and conveyed to the registration roller pair 270 through the third drawing roller pair 263, the second drawing roller pair 262, and the first drawing roller pair 261 in order. In the present exemplary embodiment, the third and fourth feed roller pairs 253 and 254 and the third and fourth drawing roller pairs 263 and 264 serve as a conveyance unit that conveys the sheets P stored in the third and fourth cassettes 243 and 244, from the casing 300A to the casing 201A.

The image forming apparatus 201 is also provided with a manual sheet feeding unit 230 in which the user can set the sheet P as desired. The sheets P set on a manual tray 240 are conveyed one by one toward the registration roller pair 270 by a feed roller pair 2501 including a feed roller and a separation roller.

After correcting the skew of the sheet P, the registration roller pair 270 feeds the sheet P toward a secondary transfer portion 218 formed between the secondary transfer roller 217 and the intermediate transfer belt 216 based on a start timing of toner image formation executed by the image forming unit 201B. A secondary transfer voltage is applied to the secondary transfer roller 217 at the secondary transfer portion 218, and thereby the toner image is secondarily transferred from the intermediate transfer belt 216 onto the sheet P. The sheet P bearing the secondarily transferred toner image is conveyed to the fixing unit 220, and heat and pressure are added to the sheet P by the fixing unit 220. The toner image is thereby fixed onto the sheet P.

Thereafter, the sheet P is stacked on the discharge tray 601 arranged in a bottom portion of a discharge space S by being conveyed by the first discharge roller pair 225*a* or the second discharge roller pair 225*b* provided on the downstream side of the fixing unit 220. When images are to be formed on both surfaces of the sheet P, the sheet P bearing an image formed on a first surface is conveyed by the reversing roller pair 222 to the re-conveyance path R. When the sheet P reaches the registration roller pair 270 again by being conveyed by re-conveyance roller pairs 224, 225, and 226 arranged on the re-conveyance path R, the sheet P is conveyed by the registration roller pair 270 to the image forming unit 201B. The sheet P bearing an image formed by the image forming unit 201B on a second surface opposite to the first surface is discharged to the discharge tray 601 by the first discharge roller pair 225*a* or the second discharge roller pair 225*b*.

The system to be employed by the image forming unit 201B is not limited to the above-described intermediate transfer system. For example, the image forming unit 201B may be an image forming unit of a direct transfer system of directly transferring a toner image formed on the photosensitive drum 212 onto the sheet P. The system to be employed is also not limited to such an electrophotographic system, and the image forming unit 201B may be an image forming unit of an inkjet system or an offset printing system.

As described above, the sheet storage device 300 can operate by receiving power supply from the power unit 280 of the image forming apparatus 201, and also by receiving a control signal from the control unit (not illustrated) of the image forming apparatus 201. For this reason, the sheet storage device 300 is not only physically coupled to the image forming apparatus 201 but also electrically connected to the image forming apparatus 201 in such a manner that power supply is received from the image forming apparatus 201 and the control signal can be received. In the present exemplary embodiment, an operator can electrically connect the sheet storage device 300 and the image forming apparatus 201 without using a connection cable or the like only by placing the image forming apparatus 201 on the sheet storage device 300. To realize this configuration, the image forming apparatus 201 is provided with a main body side connector unit and the sheet storage device 300 is provided with a unit side connector unit. The main body side connector unit and the unit side connector unit will be described with reference to FIGS. 3 to 10B referring to FIG. 3. To make the description easier to understand, FIGS. 5 and 6 have diagrams illustrating a state in which a part of a main body side connector support portion 13 to be described below is cut out.

Figure 3:
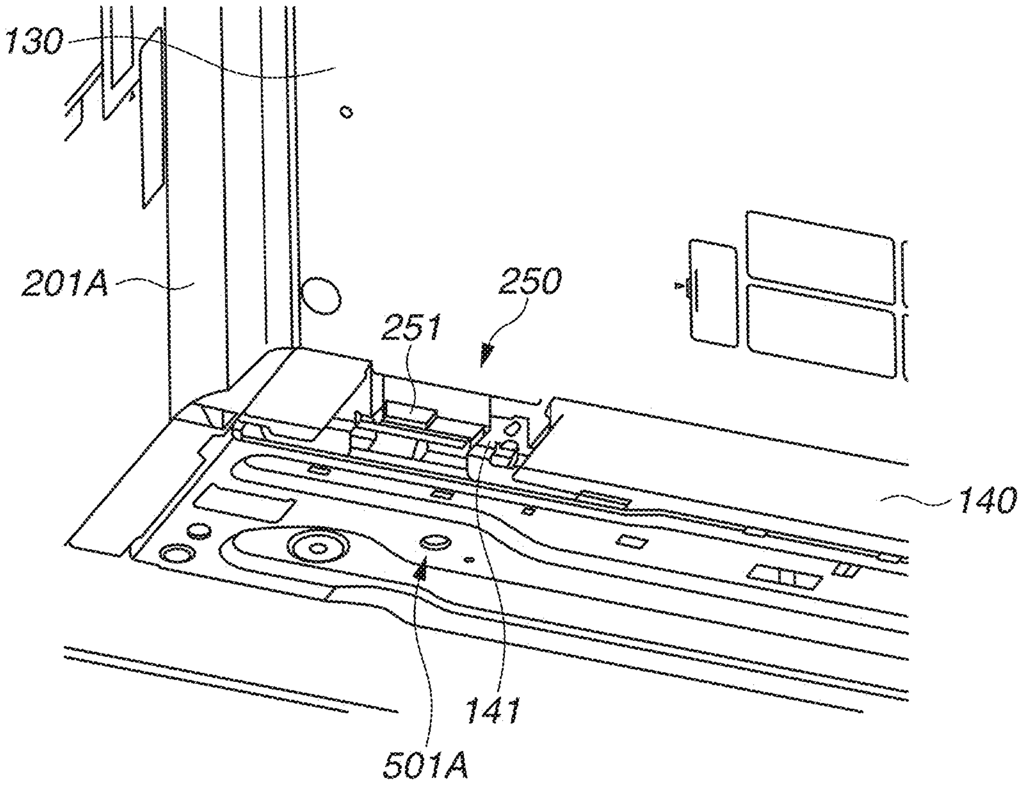
FIG. 3 is a schematic diagram illustrating a main body side connector.

As illustrated in FIG. 3, an opened bottom opening portion 141 is formed in a bottom portion 140 of the casing 201A. A main body side connector unit 250 includes a main body side terminal portion 251, and is provided in the casing 201A in such a manner that a part of the main body side terminal portion 251 is exposed from the bottom opening portion 141. The sheet storage device 300 is attached to the bottom portion 140 of the casing 201A. Thus, in the bottom portion 140, a positioning hole 501A through which a positioning pin 500A (refer to FIG. 4) of the sheet storage device 300 penetrates is provided.

Figure 4:
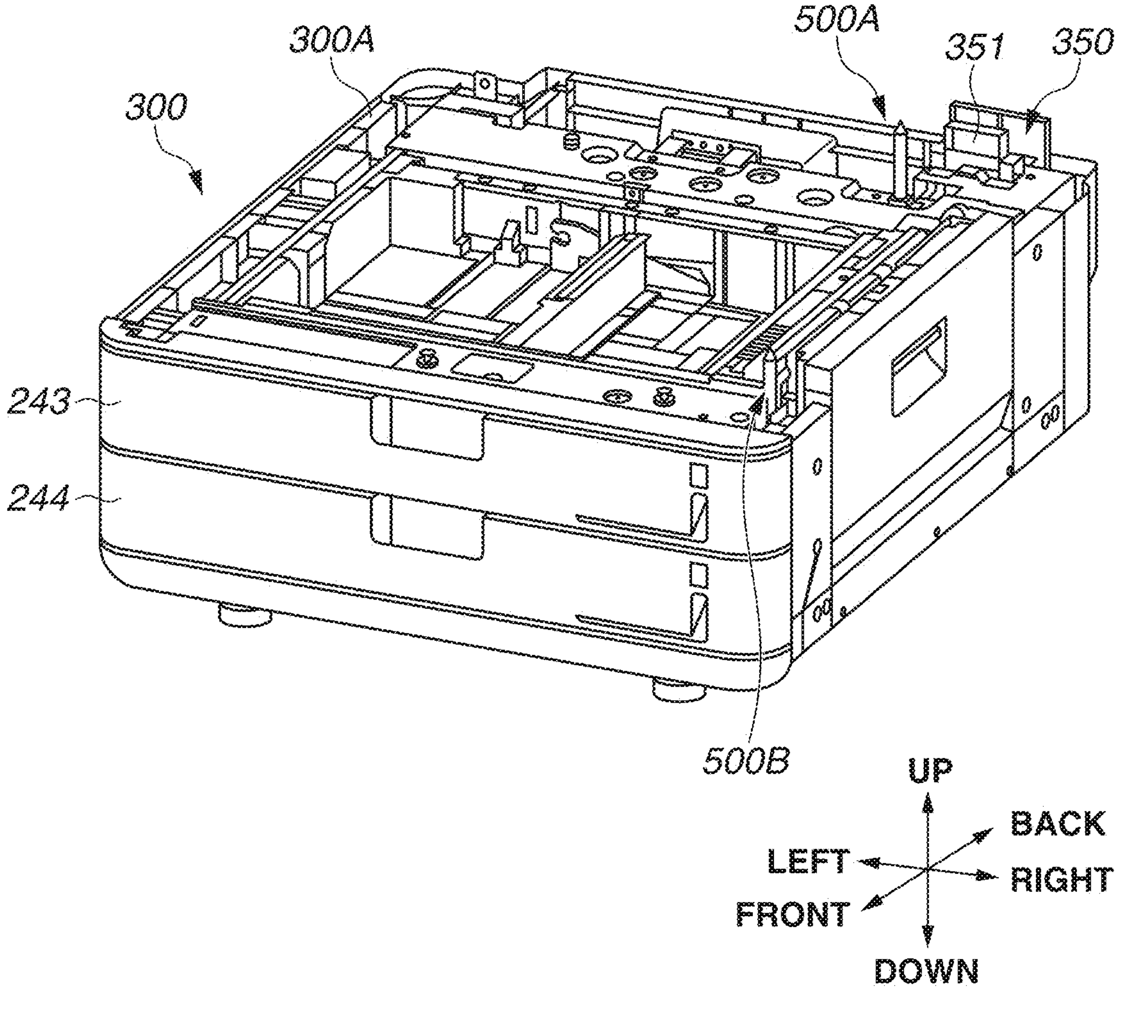
FIG. 4 is a perspective view illustrating the sheet storage device.

As illustrated in FIG. 4, the sheet storage device 300 includes the casing 300A. The casing 300A is provided with the third cassette 243 and the fourth cassette 244 in such a manner as to be drawable toward the front side. The sheet storage device 300 is provided with a unit side connector unit 350. The unit side connector unit 350 includes a unit side terminal portion 351. The unit side terminal portion 351 and the main body side terminal portion 251 (refer to FIG. 3) can fit with each other in a fitting direction (first direction).

The positioning pin 500A is fixed to the top surface of the casing 300A. When the casing 201A is stacked on the casing 300A, the positioning pin 500A of the casing 300A fits into the positioning hole 501A of the casing 201A, and relative positions of the casing 201A and the casing 300A are determined. In a similar manner, the casing 300A is provided with a positioning pin 500B illustrated in FIG. 4, and the bottom portion 140 of the casing 201A is provided with a positioning hole 501B (not illustrated). In this manner, relative positions of the casing 201A and the casing 300A may be determined by two pairs of a positioning pin and a positioning hole.

The main body side connector unit and the unit side connector unit will now be described. In the present exemplary embodiment, in the unit side connector unit, a terminal portion is fixed to a support portion, and the support portion is provided on the casing 300A via an elastic member. In contract to this, in the main body side connector unit, a terminal portion is provided on a support portion via an elastic member, and the support portion is fixed to the casing 201A.

<Main Body Side Connector Unit>

Figure 5:
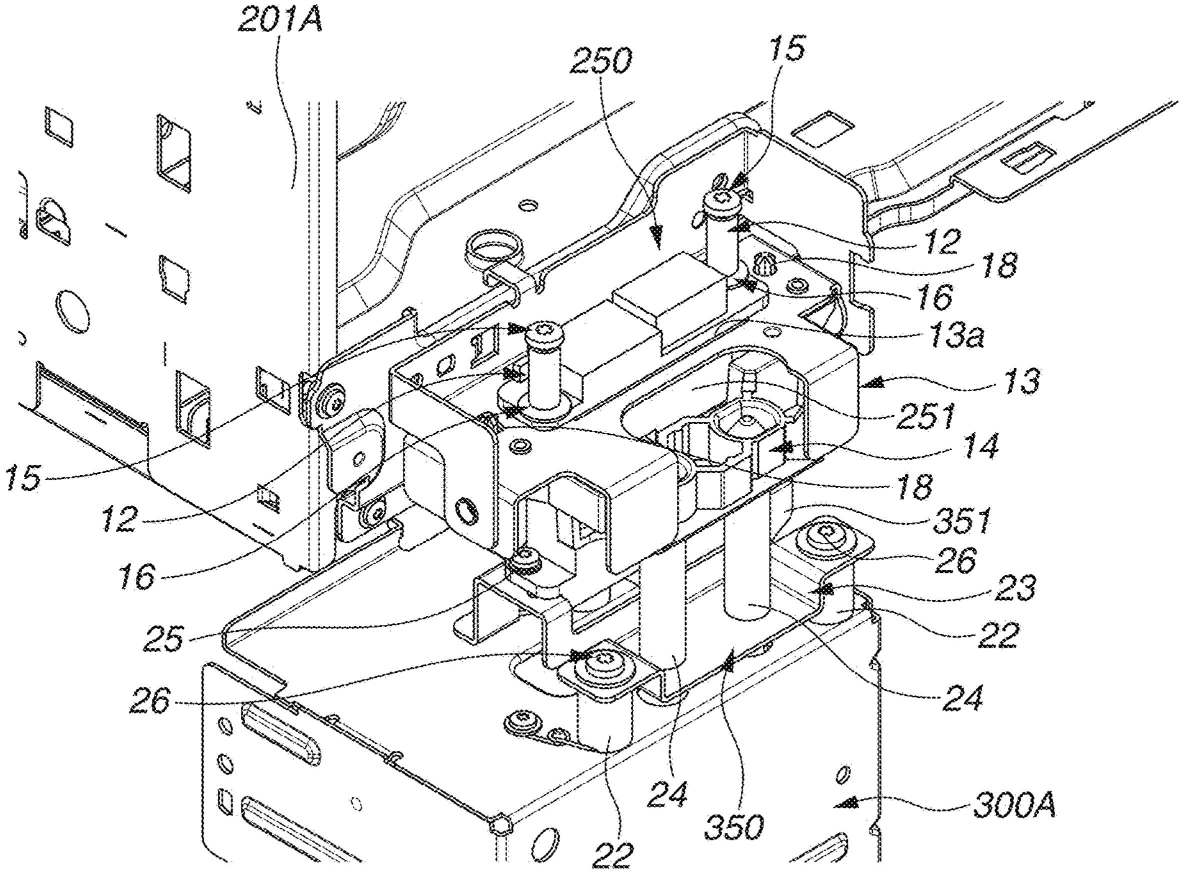
FIG. 5 is a perspective view illustrating a main body side connector unit and a unit side connector unit according to a first exemplary embodiment.
Figure 6:
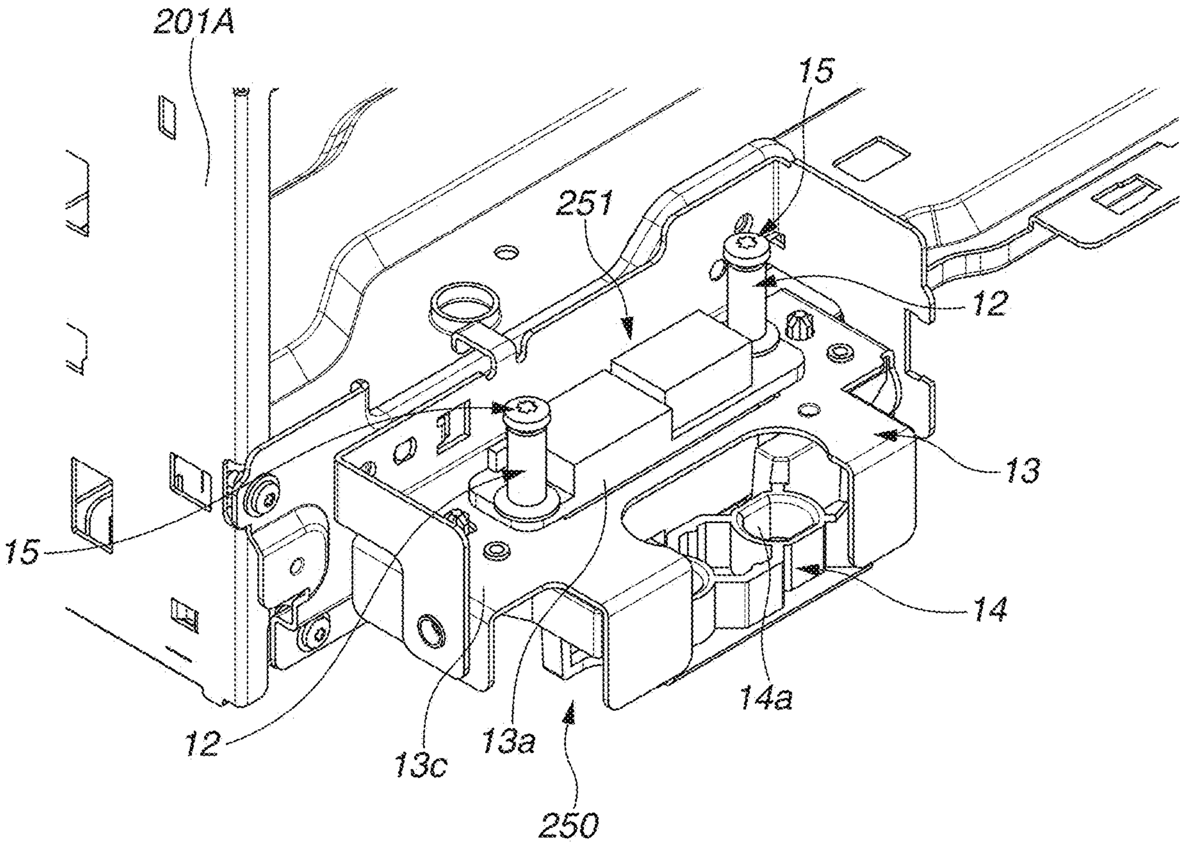
FIG. 6 is an enlarged view illustrating the main body side connector unit.

FIG. 5 is a perspective view illustrating the main body side connector unit and the unit side connector unit. FIG. 6 is an enlarged view illustrating the main body side connector unit. As illustrated in FIGS. 5 and 6, the main body side connector unit 250 serving as a second connector unit includes the main body side connector support portion 13 and the main body side terminal portion 251.

The main body side connector support portion 13 serving as a second support portion is fixed to the casing 201A. Fixing here refers to coupling or engaging of relatively reducing a movable range as compared with coupling via an elastic member, such as a mechanical spring or rubber. Examples of the fixing include methods, such as fastening with screws, welding, and adhesive bonding that uses an adhesive agent. Because the fixing is mere relative fixing, coupling that uses an elastic member with a sufficiently-high elastic modulus is one type of fixing. For this reason, in a case where the image forming apparatus 201 (the casing 201A) is attached to the sheet storage device 300 (the casing 300A), the main body side connector unit 250 moves integrally with the casing 201A. The main body side terminal portion 251 serving as a second terminal portion is supported on an attachment surface 13*c* of the main body side connector support portion 13 by stepped screw 15 arranged at two points at both left and right ends, in such a manner as to partially protrude downward from an opening 13*a* formed in the main body side connector support portion 13.

Figure 8:
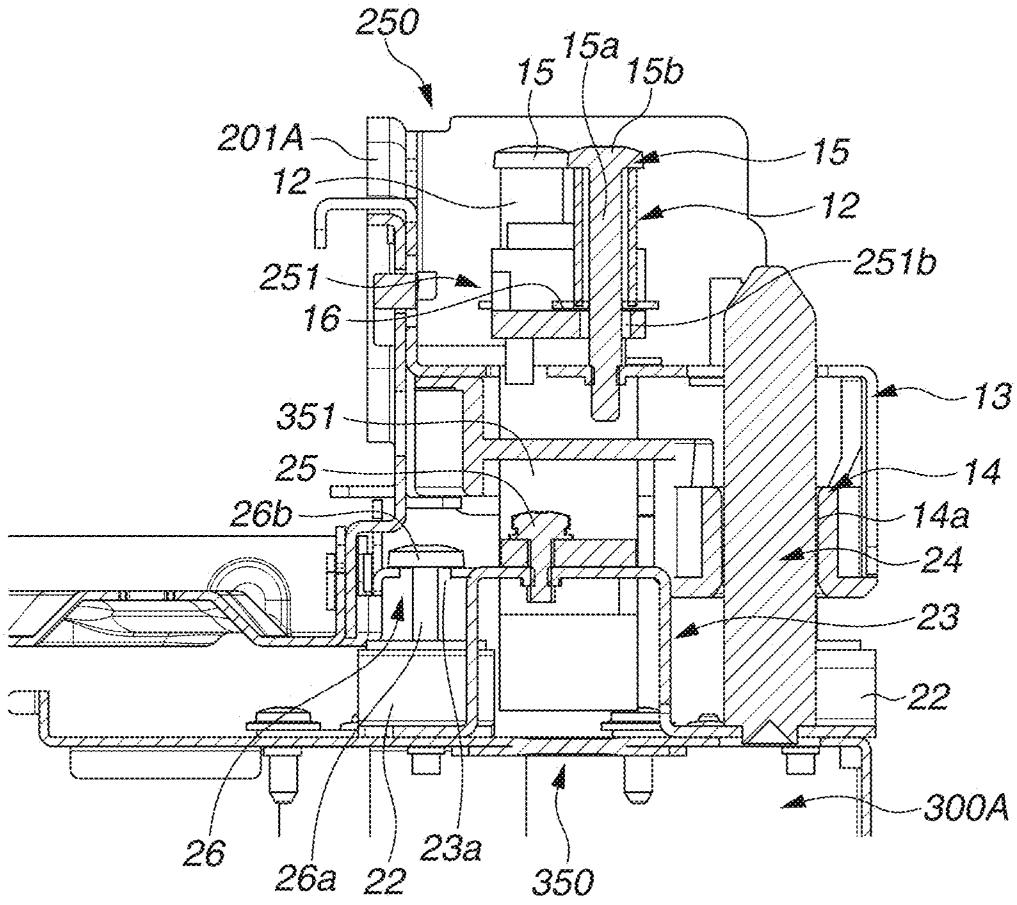
FIG. 8 is a side cross-sectional view illustrating the main body side connector unit and the unit side connector unit in an attached state.

FIG. 8 is a side cross-sectional view illustrating the main body side connector unit and the unit side connector unit. As illustrated in FIG. 8, the stepped screws 15 are arranged at positions not overlapping each other when viewed from a left-right direction. That is, the positions of the two stepped screws 15 in a front-back direction differ from each other. In the main body side terminal portion 251, a screw through-hole 251*b* through which a shaft portion 15*a* of the stepped screw 15 serving as a fastening member passes is formed. The shaft portion 15*a* extends along the fitting direction (first direction) in which the main body side terminal portion 251 and the unit side terminal portion 351 can fit with each other. A diameter of the screw through-hole 251*b* is larger than a diameter of the shaft portion 15*a* of the stepped screw 15, and a clearance gap is provided between the screw through-hole 251*b* and the shaft portion 15*a* of the stepped screw 15.

A coil spring 12 serving as a second biasing member is arranged around the shaft portion 15*a* of the stepped screw 15, and one end portion of the coil spring 12 has contact with a head portion 15*b* of the stepped screw 15. The coil spring 12 provided between the head portion 15*b* (contact portion) and the main body side connector support portion 13 bias the main body side terminal portion 251 toward the unit side connector unit 350 in such a manner as to make the main body side terminal portion 251 relatively movable to the main body side connector support portion 13 in a direction intersecting with the fitting direction, specifically, in all directions intersecting with the shaft portion 15*a*. In place of the coil spring 12, an annular rubber member having elasticity may be arranged.

The coil spring 12 also allows the main body side terminal portion 251 to be relatively displaced in the fitting direction with respect to the main body side connector support portion 13. Thus, the main body side terminal portion 251 can also rotate around an arbitrary axis relative to the main body side connector support portion 13. In this manner, the movement in the present exemplary embodiment includes both a horizontal movement of the main body side terminal portion 251 with respect to the main body side connector support portion 13, and the rotation of the main body side terminal portion 251 around a certain axis with respect to the main body side connector support portion 13. In the case of rotation, a moving range means the range of a rotational angle. This definition of movement is not limited to the relative movement of the main body side terminal portion 251 and the main body side connector support portion 13, and the same applies to arbitrary two members.

In the main body side connector support portion 13, a guide portion 14 is provided at a point on the back side that is distant from the main body side terminal portion 251 in such a manner as not to overlap the main body side terminal portion 251 when viewed from the left-right direction. In the guide portion 14, guide holes 14*a* for inserting or removing guide pins 24 provided on the unit side connector unit 350 are formed at two points separated in the left-right direction.

<Unit Side Connector Unit>

Figure 7:
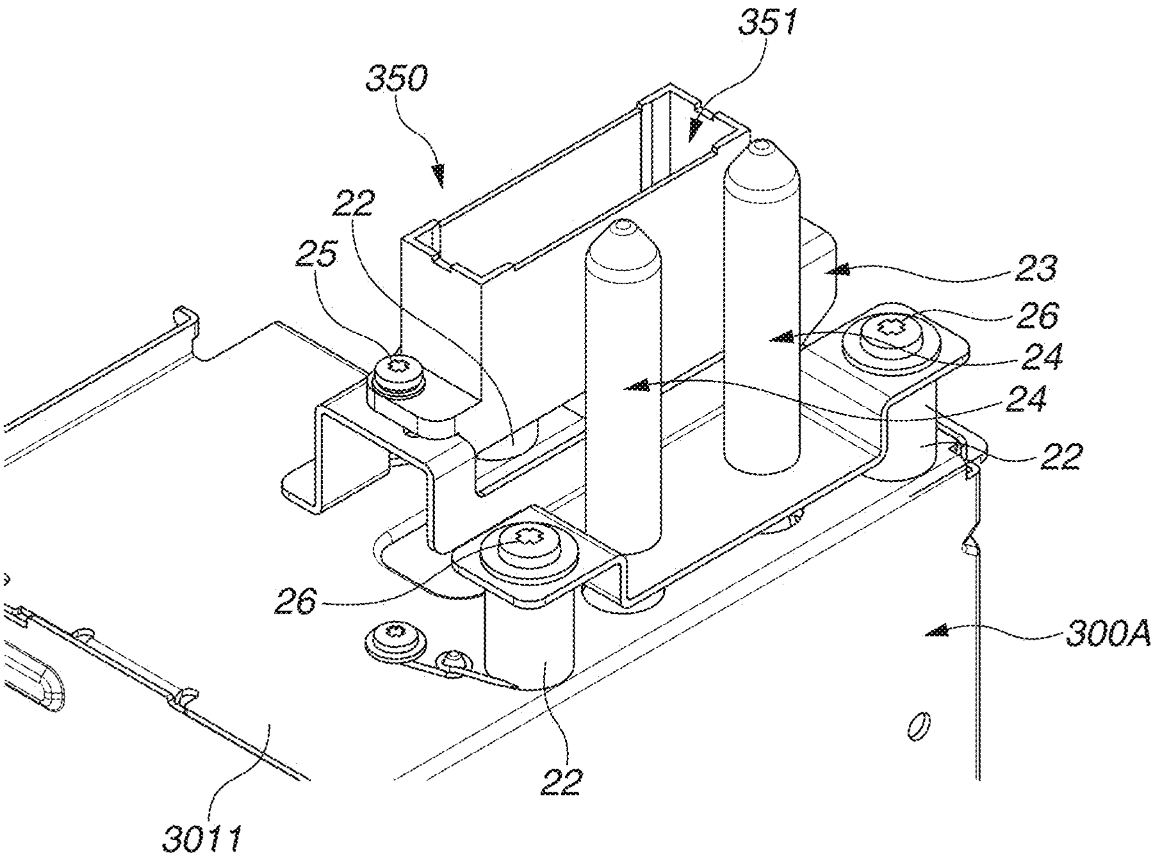
FIG. 7 is an enlarged view illustrating the unit side connector unit.

FIG. 7 is an enlarged view illustrating the unit side connector unit. As illustrated in FIGS. 5 and 7, the unit side connector unit 350 serving as a first connector unit includes the unit side terminal portion 351, a unit side connector support portion 23, and a guide pin 24 serving as a positioning member. The unit side terminal portion 351 serving as a first terminal portion is fixed to the unit side connector support portion 23 by fixing screws 25 arranged at both left and right ends. The unit side terminal portion 351 is electrically connected with the main body side terminal portion 251 with being fitted therewith.

The unit side connector support portion 23 serving as a first support portion is attached to the casing 300A by stepped screws 26 arranged at three points as an example and a coil spring 22. The stepped screws 26 are arranged at two points at both ends in the left-right direction on the back side, and at one point at the center in the left-right direction on the front side, for example. As illustrated in FIG. 8, in the unit side connector support portion 23, a screw through-hole 23*a* through which a shaft portion 26*a* of the stepped screw 26 passes is formed. A diameter of the screw through-hole 23*a* is larger than a diameter of the shaft portion 26*a* of the stepped screw 26, and a clearance gap is provided between the screw through-hole 23*a* and the shaft portion 26*a* of the stepped screw 26.

In the present exemplary embodiment, the coil spring 22 is arranged between a head portion 26*b* of the stepped screw 26 and the casing 300A. The coil spring 22 serving as a first biasing member bias the unit side connector support portion 23 toward the main body side connector unit 250 arranged above, in such a manner that the unit side connector support portion 23 makes the unit side connector unit 350 movable relative to an attachment surface 3011 on which the unit side connector unit 350 is attached in the casing 300A, in a direction intersecting with the fitting direction (specifically, in all directions intersecting with the shaft portion 26*a*). In place of the coil spring 22, an annular rubber member having elasticity may be arranged.

The coil spring 22 also allows the unit side connector support portion 23 to be relatively displaced in the fitting direction relative to the casing 300A. Accordingly, the unit side connector support portion 23 can also rotate around an arbitrary axis relative to the casing 300A. As described above, the movement includes both of the horizontal movement and rotation.

In the unit side connector unit 350, the unit side connector support portion 23 fixing the unit side terminal portion 351 is movable relative to a casing of an external unit by the coil spring 22. In the main body side connector unit, the main body side terminal portion 251 is movable relative to the main body side connector support 13 portion fixed to an apparatus main body, by the coil spring 22. A movable range of the unit side connector support portion 350 relative to the casing is larger than a movable range of the main body side terminal portion 251 relative to the main body side connector support portion 13. With this configuration, when attaching the apparatus main body and the external unit, it is possible to widen an allowable range of positional shifts between the unit side terminal portion 351 and the main body side terminal portion 251, and easily locate the unit side terminal portion 351 and the main body side terminal portion 251 at positions where these can fit with each other.

The above-described main body side terminal portion 251 and the unit side terminal portion 351 each include a plurality of electric contact portions. The main body side terminal portion 251 includes a protruding housing with a protruding side surface portion facing the unit side terminal portion 351 when fitting with the unit side terminal portion 351. In the protruding housing, a plurality of electric contact portions is arranged side by side in the left-right direction. In contrast, the unit side terminal portion 351 includes a recessed housing with a recessed side surface portion facing the main body side terminal portion 251 when fitting with the main body side terminal portion 251. In the recessed housing, a plurality of electric contact portions is arranged side by side in the same direction as the electric contact portions of the main body side terminal portion 251.

Figure 9:
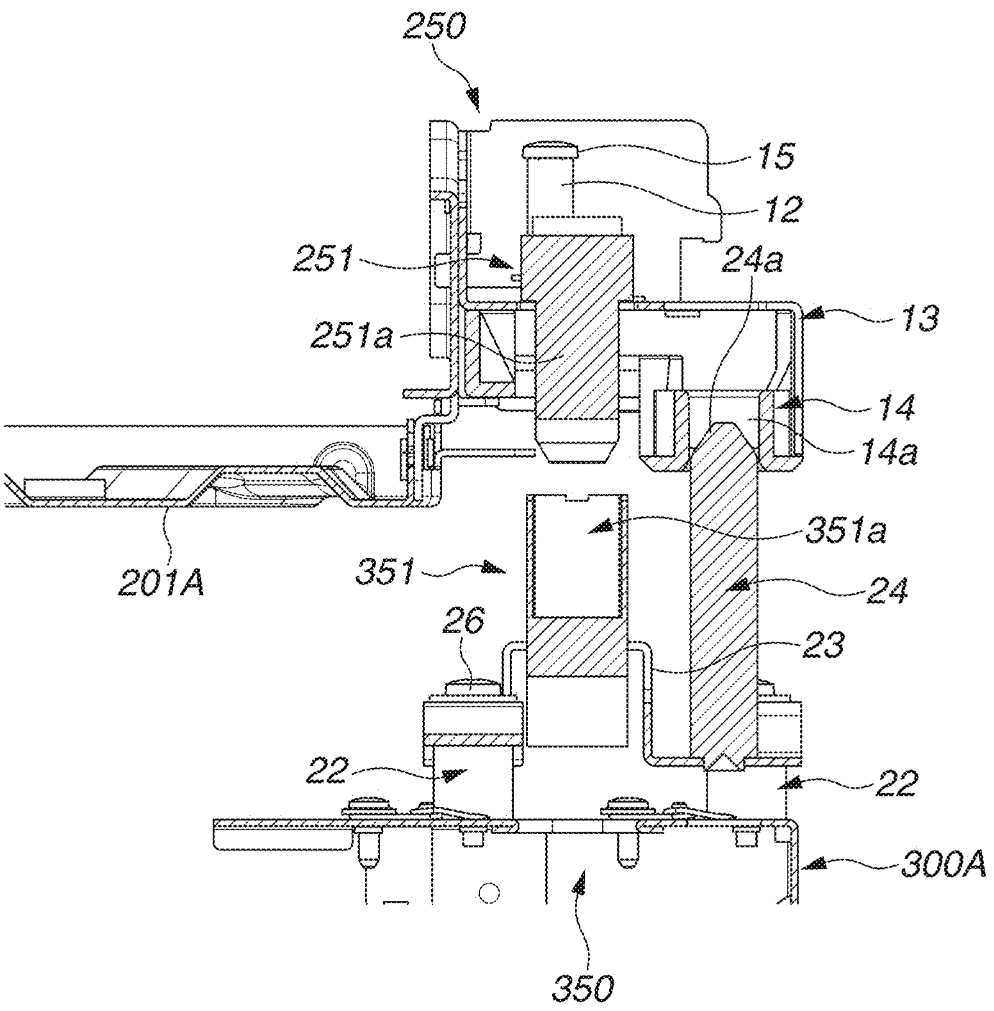
FIG. 9 is a side cross-sectional view illustrating a state at a time point when a guide pin starts to enter a guide hole.

By the main body side terminal portion 251 and the unit side terminal portion 351 being fitted with each other via the protruding housing and the recessed housing, their electric contact portions enter a contact state and are electrically connected. For example, as illustrated in FIG. 9, the main body side terminal portion 251 is a male connector including a pin-shaped connection terminal 251*a* as an electric contact portion. In contrast to this, the unit side terminal portion 351 is a female connector including a connection terminal 351*a* that has a bent leading end portion on the main body side terminal portion 251 side to have elasticity as an electric contact portion, and ensures electric connection across the connection terminal 251*a* of the main body side terminal portion 251. Then, a power supply line for supplying power from the image forming apparatus 201 to the sheet storage device 300, and a signal line for transmitting and receiving a control signal are coupled to the main body side terminal portion 251 and the unit side terminal portion 351. Examples of the above-described main body side terminal portion 251 and the unit side terminal portion 351 include, for example, a drawer connector.

<Guide Pin>

As illustrated in FIGS. 7 and 8, in addition to the unit side terminal portion 351 being fixed to the unit side connector support portion 23, the unit side connector support portion 23 is provided with the guide pin 24 protruding toward the main body side connector unit 250 arranged above. The guide pins 24 are provided at two points on the back side that is distant from the unit side terminal portion 351 in such a manner as not to overlap the main body side terminal portion 251 when viewed from the left-right direction. The guide pin 24 is inserted into and removed from a guide hole 14*a* of the main body side connector unit 250.

FIG. 9 is a side cross-sectional view illustrating a state at a time point at which the guide pin 24 starts to enter the guide hole 14*a*. As illustrated in FIG. 9, when the casing 201A and the casing 300A are attached, a leading end portion 24*a* of the guide pin 24 enters the guide hole 14*a* of the main body side connector unit 250 before the connection terminal 251*a* of the main body side terminal portion 251 is inserted into the connection terminal 351*a* of the unit side terminal portion 351. Thereafter, the positions of the unit side connector support portion 23 and the main body side connector support portion 13 are fixed by the guide pin 24 being appropriately inserted into the guide hole 14*a*. The guide pin 24 is, for example, a rod-like member having a circular cross-section, and the leading end portion 24*a* has an inclined surface formed at a tilt in such a manner that a diameter on the leading end side becomes small, to make insertion into the guide hole 14*a* easy when the casing 201A and the casing 300A are attached.

Figure 10A:
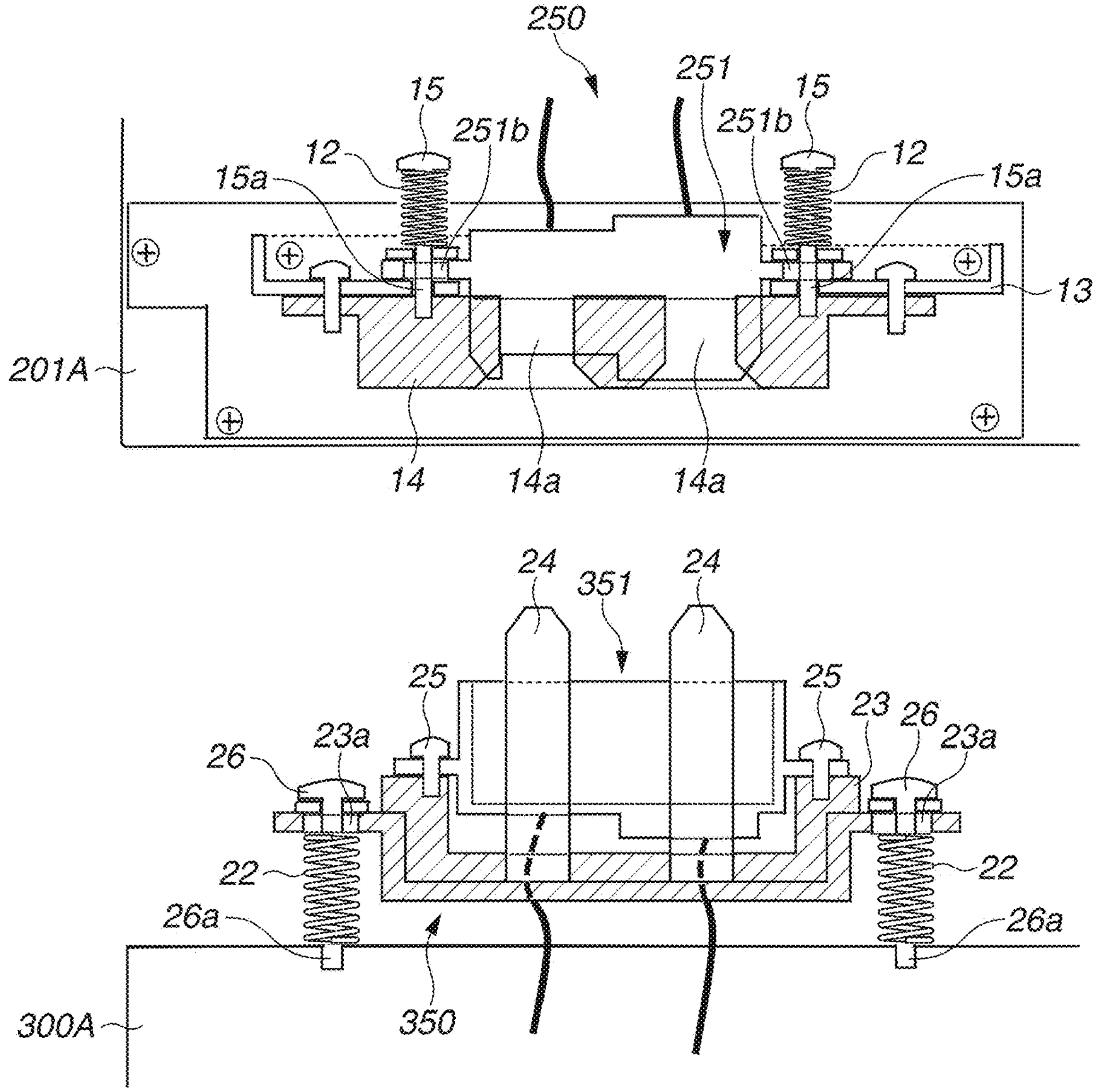
FIG. 10A is a schematic diagram illustrating the main body side connector unit and the unit side connector unit according to the first exemplary embodiment.
Figure 10B:
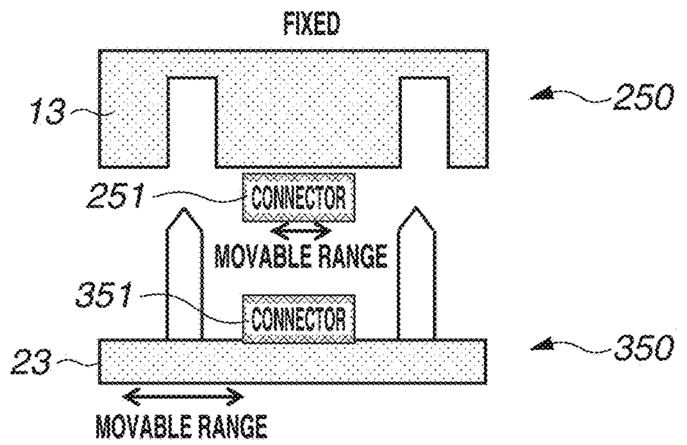
FIG. 10B is a schematic diagram illustrating movable ranges.

FIG. 10A illustrates cross-sectional views of the main body side connector unit 250 and the unit side connector unit 350. FIG. 10B is a schematic diagram illustrating movable ranges of the main body side connector unit 250 and the unit side connector unit 350. As illustrated in an upper part of FIG. 10A, the main body side connector support portion 13 is fixed to the casing 201A in the main body side connector unit 250. The main body side terminal portion 251 is provided movable relative to the main body side connector support portion 13 by the stepped screws 15 and the coil springs 12. A diameter of a screw through-hole 251*b* formed in the main body side terminal portion 251 is larger than the diameter of the shaft portions 15*a* of the stepped screws 15. A clearance gap is provided between the screw through-hole 251*b* and the shaft portions 15*a* of the stepped screws 15. The clearance gap has a size that allows the main body side terminal portion 251 to move to the main body side connector support portion 13 in a direction (second direction) intersecting with the fitting direction.

In contrast, as illustrated in a lower part of FIG. 10A, in the unit side connector unit 350, the unit side terminal portion 351 is fixed to the unit side connector support portion 23 by fixing screws 25, and the unit side connector support portion 23 is provided movably relative to the casing 300A with the stepped screws 26 and the coil springs 22. The diameter of the screw through-hole 23*a* formed in the unit side connector support portion 23 is larger than the diameter of the shaft portion 26*a* of the stepped screw 26. A clearance gap is provided between the screw through-hole 23*a* and the shaft portion 26*a* of the stepped screw 26. The clearance gap has a size that enables the unit side connector support portion 23 to move to the casing 300A in a direction (second direction) in which the main body side terminal portion 251 can move toward the main body side connector support portion 13.

In the present exemplary embodiment, as illustrated in FIG. 10B, the movable range of the unit side connector support portion 23 relative to the casing 300A is made larger than the movable range of the main body side terminal portion 251 relative to the main body side connector support portion 13. To achieve this, the sizes of the screw through-holes 23*a* and 251*b* and the stepped screws 26 and 15 are adjusted in such a manner that the clearance gap between the screw through-hole 23*a* and the shaft portion 26*a* of the stepped screw 26 becomes larger than the clearance gap between the screw through-hole 251*b* and the shaft portions 15*a* of the stepped screws 15. The method of restricting a movable range is not limited to the method of restricting a movable range by a movable range of a stepped screw in a screw through-hole. Another position regulation member may be appropriately added to limit a movable range in place of a screw through-hole.

In this manner, in the first exemplary embodiment, when the casing 201A and the casing 300A are attached, the unit side connector support portion 23 can move drastically with respect to the casing 300A, and thus it becomes easy to locate the main body side connector support portion 13 and the unit side connector support portion 23 at positions where the guide pin 24 can be inserted into the guide hole 14*a*. In a state in which the guide pin 24 is inserted into the guide hole 14*a*, relative positions of the unit side connector support portion 23 and the main body side connector support portion 13 are regulated within a fixed range. On the other hand, in this state, the main body side terminal portion 251 can relatively move within a wider range relative to the unit side terminal portion 351 fixed to the unit side connector support portion 23. This enables the unit side terminal portion 351 and the main body side terminal portion 251 to be appropriately fitted with each other.

It is desirable that the biasing force of the coil springs 22 biasing the unit side connector support portion 23 is made smaller than the biasing force of the coil springs 12 biasing the main body side terminal portion 251. By making the biasing force of the coil spring 22 smaller, the inclination and movement with respect to the casing 300A of the unit side connector support portion 23 become smooth when the casing 201A and the casing 300A are attached. Angles and positions of the main body side connector support portion 13 and the unit side connector support portion 23 are thereby corrected easily to angles and positions where the guide pin 24 can be inserted into the guide hole 14*a*. Consequently, the work of attaching the image forming apparatus 201 to the sheet storage device 300 becomes easy.

The biasing force of the coil springs 12 biasing the main body side terminal portion 251 is larger than the biasing force of the coil spring 22 biasing the unit side connector support portion 23. When the attachment of the casing 201A and the casing 300A is completed, the unit side terminal portion 351 is thereby fixed to the top surface of the casing 300A, and the main body side terminal portion 251 and the unit side connector support portion 23 can assume stable posture without inclining with respect to the casing 201A and the casing 300A. Consequently, contact between the connection terminal 351*a* and the connection terminal 251*a* is easily ensured when the unit side terminal portion 351 and the main body side terminal portion 251 fit to each other.

As described above, in the present exemplary embodiment, in the unit side connector unit 350, the unit side terminal portion 351 is fixed to the unit side connector support portion 23, and the unit side connector support portion 23 is provided movably relative to the casing 300A by the coil spring 22. In contrast to this, in the main body side connector unit 250, the main body side terminal portion 251 is provided movably relative to the main body side connector support portion 13 by the coil spring 12, and the main body side connector support portion 13 is fixed to the casing 201A. The movable range of the unit side connector support portion 23 relative to the casing 300A is larger than the movable range of the main body side terminal portion 251 relative to the main body side connector support portion 13.

An effect to be obtained by such a configuration will be described. When the casing 201A and the casing 300A are attached, the casing 201A and the casing 300A are sometimes inclined with respect to each other. In such a case, the main body side terminal portion 251 and the unit side terminal portion 351 can be appropriately fitted with each other. As described above, in the present exemplary embodiment, the fitting of the main body side terminal portion 251 and the unit side terminal portion 351 started after the guide pin 24 is inserted into the guide hole 14*a*. When the guide pin 24 is inserted into the guide hole 14*a* and the terminal portions are not in contact with each other, relative angles and positions of the unit side connector unit 350 and the main body side connector unit 250 are regulated within a fixed range by the guide pin 24 and the guide holes 14*a*. In other words, the unit side connector support portion 23 of the unit side connector unit 350 moves integrally with the main body side connector unit 250. Thus, the position of the unit side connector support portion 23 is shifted with respect to the casing 300A in accordance with the inclination of the casing 201A. If the movable range of the unit side connector support portion 23 relative to the casing 300A is relatively large, the unit side connector support portion 23 can follow even large inclination.

On the other hand, if the relative angles and positions of the unit side connector unit 350 and the main body side connector unit 250 is regulated within a fixed range, the regulation can be a constraint for appropriate fitting of the main body side terminal portion 251 and the unit side terminal portion 351. If the main body side terminal portion 251 and the main body side connector support portion 13 are relatively movable, even attachment of the casing 201A and the casing 300A progresses, the main body side terminal portion 251 and the unit side terminal portion 351 can be appropriately fitted with each other. In order to acquire such an effect, the relative movement of the unit side connector support portion 23 with respect to the casing 300A may only be rotation around an arbitrary axis.

The case where another effect is obtained will be described. When the casing 201A is stacked on the casing 300A, the relative positions of the casings are determined by the lower positioning pin 500A fitting into the upper positioning hole 501A. Nevertheless, each component can include a manufacturing error or an assembly error with respect to a designed size. Thus, even if the positioning pin 500A and the positioning hole 501A are fitted with each other, positional shifts of the unit side connector unit 350 and the main body side connector unit 250 can sometimes occur. For this reason, the movable range of the unit side connector support portion 23 relative to the casing 300A is relatively large, and thereby the guide pin 24 can be appropriately inserted into the guide hole 14*a* even if such positional shifts of connector units occur. The above-described advantage is obtained when the terminal portions are fitted with each other after the guide pin 24 is inserted into the guide hole 14*a*. If a desired effect is just this effect, the relative movement of the unit side connector support portion 23 that can be performed relative to the casing 300A may be only horizontal movement in a direction intersecting with the fitting direction. In a case where a positional shift of the stepped screw 26 of the casing 300A relative to the main body side connector support portion 13 is large in terms of part accuracy, it is sufficient that the movable range of the unit side connector support portion 23 relative to the casing 300A is expanded to a maximum presumable positional shift amount.

If fitting is started with the main body side terminal portion 251 being inclined relative to the unit side terminal portion 351, force equal to or larger than supposed power is sometimes received by the main body side terminal portion 251 contacting an inner wall of the unit side terminal portion 351 or being caught on an inner wall edge portion. In such a case, the main body side terminal portion 251, the unit side terminal portion 351, the unit side connector unit 350, or the main body side connector unit 250 might be damaged.

In view of the foregoing, according to the present exemplary embodiment, it is possible to reduce the possibility of damage occurrence at the main body side terminal portion 251, the unit side terminal portion 351, the unit side connector unit 350, or the main body side connector unit 250. Specifically, it is sufficient that, the unit side connector support portion 23 moves relative to the casing 300A, and the unit side connector unit 350 inclines with respect to the casing 300A in accordance with contact between the main body side connector unit 250 and the unit side connector unit 350, as described above.

Figure 11:
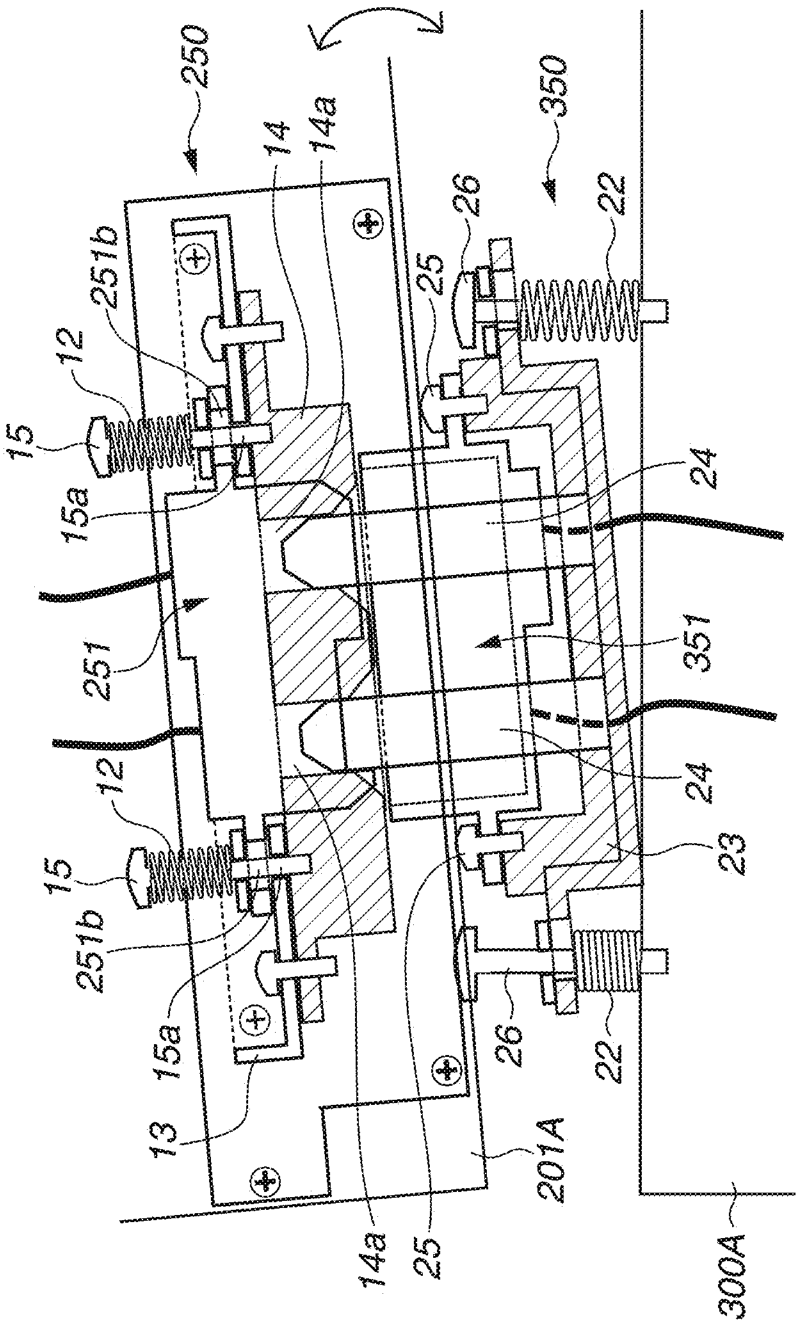
FIG. 11 is a cross-sectional view illustrating a state in which the unit side connector unit is inclined with respect to the main body side connector unit.

FIG. 11 illustrates a state in which the unit side connector unit 350 is inclined with respect to the main body side connector unit 250. As illustrated in FIG. 11, the main body side connector support portion 13 is fixed to the casing 201A, and thus the main body side connector unit 250 inclines integrally with the casing 201A.

When the casing 201A and the casing 300A are to be attached, a fitting direction for attaching the casing 300A and the casing 201A is inclinable (direction intersecting with the up-down direction) with respect to a fitting direction (up-down direction) set in a state in which the casing 300A and the casing 201A are attached. For example, if downward external force is applied to the unit side connector unit 350 via the guide pin 24, the unit side connector unit 350 is moved downward against the biasing force of the coil springs 22 as illustrated in FIG. 11. At this time, depending on the point where the unit side connector unit 350 to which external force is applied, force to be applied varies among the coil springs 22 arranged at three points, and a compression amount also varies among the three coil springs 22. The inclination of the unit side connector unit 350 accordingly changes.

If the unit side connector unit 350 inclines in this manner, the guide pin 24 can straightforwardly enter the guide hole 14*a*. As a result, the guide pin 24 is appropriately inserted into the guide hole 14*a*. Relative angles and positions of the unit side connector support portion 23 and the main body side connector support portion 13 can therefore be regulated within a fixed range. In this manner, even if positional shifts of the unit side terminal portion 351 and the main body side terminal portion 251 occur due to inclined attachment of the casing 201A and the casing 300A, the guide pin 24 is inserted in the guide hole 14*a*, and thereby the angles and positions of the unit side terminal portion 351 and the main body side terminal portion 251 can easily be fixed to angles and/or positions where these can fit with each other.

Figure 12A:
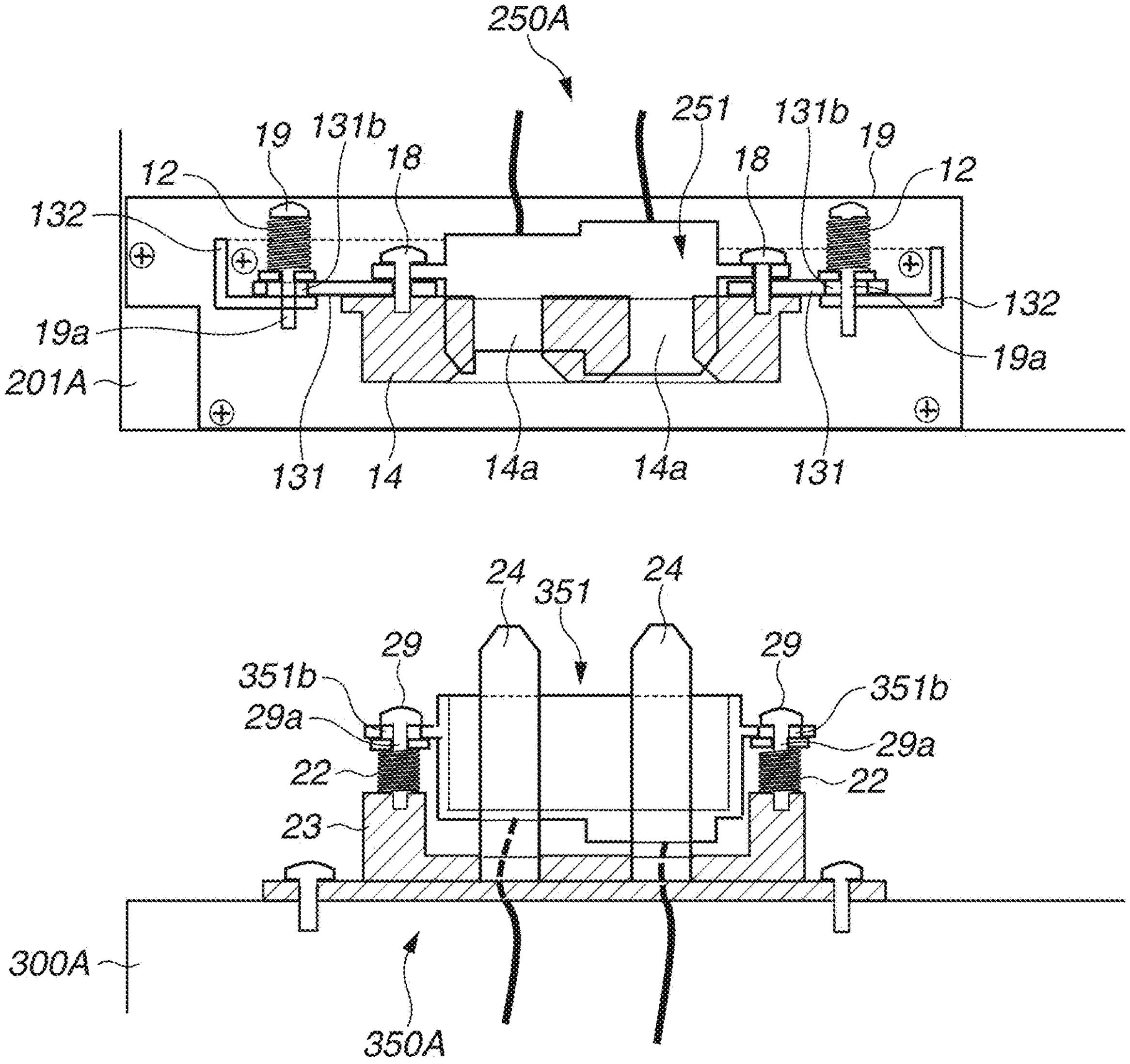
FIG. 12A is a schematic diagram illustrating a main body side connector unit and a unit side connector unit according to a second exemplary embodiment.
Figure 12B:
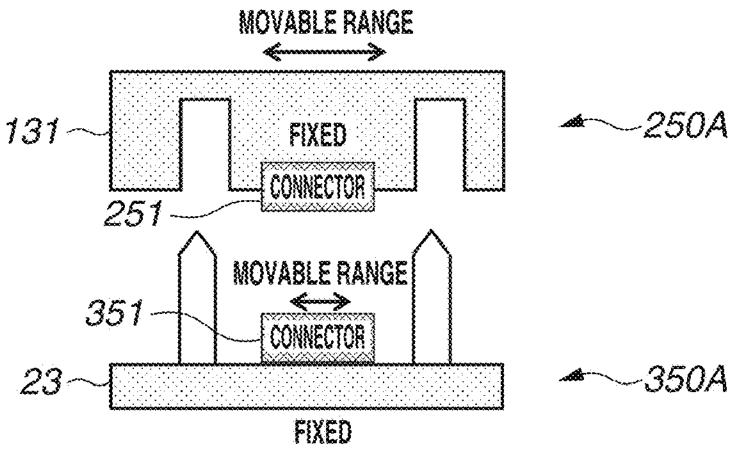
FIG. 12B is a schematic diagram illustrating movable ranges.

Next, a main body side connector unit and a unit side connector unit according to a second exemplary embodiment will be described with reference to FIGS. 12A and 12B. FIG. 12A is a schematic diagram illustrating a main body side connector unit and a unit side connector unit according to the second exemplary embodiment. FIG. 12B is a schematic diagram illustrating movable ranges of the main body side connector unit and the unit side connector unit according to the second exemplary embodiment. In the second exemplary embodiment, components similar to those in the above-described first exemplary embodiment are assigned the same reference numerals, and the description will be simplified or omitted.

In the first exemplary embodiment, (1) In a unit side connector unit, (1-a) a terminal portion is fixed to a support portion, and (1-b) the support portion is provided on the casing 300A via an elastic member.

On the other hand, (2) in a main body side connector unit, (2-a) a terminal portion is provided on a support portion via an elastic member, and (2-b) the support portion is fixed to the casing 201A.

In contrast to this, in the second exemplary embodiment, (1) in a unit side connector unit, (1-a) a terminal portion is provided on a support portion via an elastic member, and (1-b) the support portion is fixed to the casing 300A.

On the other hand, (2) in a main body side connector unit, (2-a) a terminal portion is fixed to a support portion, and (2-b) the support portion is fixed to the casing 201A via an elastic member.

As illustrated in an upper part of FIG. 12A, a main body side connector unit 250A (corresponding to the first connector unit) includes the main body side connector support portion 131 and the main body side terminal portion 251. The main body side connector support portion 131 is provided with the guide portion 14. The main body side connector support portion 131 is provided movably relative to a protruding support portion 132 protruding from the casing 201A, by a stepped screw 19 and the coil spring 12. The main body side terminal portion 251 is fixed to the main body side connector support portion 131 by a fixing screw 18.

In the main body side connector support portion 131, a screw through-hole 131*b* through which a shaft portion 19*a* of the stepped screw 19 passes is formed. The shaft portion 19*a* extends along a fitting direction (first direction) in which the main body side terminal portion 251 and the unit side terminal portion 351 can fit with each other. A diameter of the screw through-hole 131*b* is larger than a diameter of the shaft portion 19*a* of the stepped screw 19, and a clearance gap is provided between the screw through-hole 131*b* and the shaft portion 19*a* of the stepped screw 19. The coil spring 12 is arranged around the shaft portion 19*a* of the stepped screw 19. The coil spring 12 bias the main body side connector support portion 131 toward the unit side connector unit 350 in such a manner as to make the main body side connector support portion 131 movable relative to the protruding support portion 132 in a direction (second direction) intersecting with the fitting direction (here, in all directions intersecting with the shaft portion 19*a*).

The coil spring 12 also allows the main body side connector support portion 131 to be relatively displaced in the fitting direction relative to the protruding support portion 132. Accordingly, the main body side connector support portion 131 can also rotate around an arbitrary axis relative to the protruding support portion 132.

On the other hand, as illustrated in a lower part of FIG. 12A, in the unit side connector unit 350A (corresponding to the second connector unit), the unit side connector support portion 23 is fixed to the casing 300A.

The unit side terminal portion 351 is provided movably relative to the unit side connector support portion 23 by a stepped screw 29 and the coil spring 22. In the unit side terminal portion 351, a screw through-hole 351*b* through which a shaft portion 29*a* of the stepped screw 29 passes is formed. A diameter of the screw through-hole 351*b* is larger than a diameter of the shaft portion 29*a* of the stepped screw 29, and a clearance gap is provided between the screw through-hole 351*b* and the shaft portion 29*a* of the stepped screw 29.

In the present exemplary embodiment, the coil spring 22 is arranged between a head portion of the stepped screw 29 and the unit side connector support portion 23. The coil spring 22 bias the unit side terminal portion 351 toward the main body side connector unit 250 arranged above, in such a manner as to make the unit side terminal portion 351 movable relative to the unit side connector support portion 23 in a direction intersecting with the fitting direction of the unit side connector unit 350.

In place of the coil spring 22, an annular rubber member having elasticity may be arranged. The coil spring 22 also allows the unit side terminal portion 351 to be relatively displaced in the fitting direction relative to the unit side connector support portion 23. Accordingly, the unit side terminal portion 351 can also rotate around an arbitrary axis relative to the unit side connector support portion 23.

In the present exemplary embodiment, as illustrated in FIG. 12B, the movable range of the main body side connector support portion 131 relative to the casing 201A is larger than the movable range of the unit side terminal portion 351 relative to the unit side connector support portion 23. To achieve this, the sizes of the screw through-holes 131*b* and 351*b* and the stepped screws 19 and 29 are adjusted in such a manner that the clearance gap between the screw through-hole 131*b* and the shaft portion 19*a* of the stepped screw 19 becomes larger than the clearance gap between the screw through-hole 351*b* and the shaft portions 29*a* of the stepped screws 29, as an example of a movable range regulation unit.

With this configuration, an effect similar to that of the first exemplary embodiment can be obtained also in the second exemplary embodiment. Specifically, in the second exemplary embodiment, when the casing 201A and the casing 300A are attached, the main body side connector support portion 131 can move drastically relative to the casing 201A, and therefore it becomes easier to locate the main body side connector support portion 131 and the unit side connector support portion 23 at positions where the guide pin 24 can be inserted into the guide hole 14*a*. In a state in which the guide pin 24 is inserted in the guide hole 14*a*, the unit side connector support portion 23 and the main body side connector support portion 13 do not relatively move, and only the main body side terminal portion 251 can move relative to the unit side terminal portion 351 fixed to the unit side connector support portion 23. As a result, an effect is thereby obtained of enabling the unit side terminal portion 351 and the main body side terminal portion 251 to be appropriately fitted with each other, which is an effect similar to that of the above-described first exemplary embodiment. In the second exemplary embodiment, the main body side connector support portion 131 may incline with respect to the casing 201A.

Figure 13A:
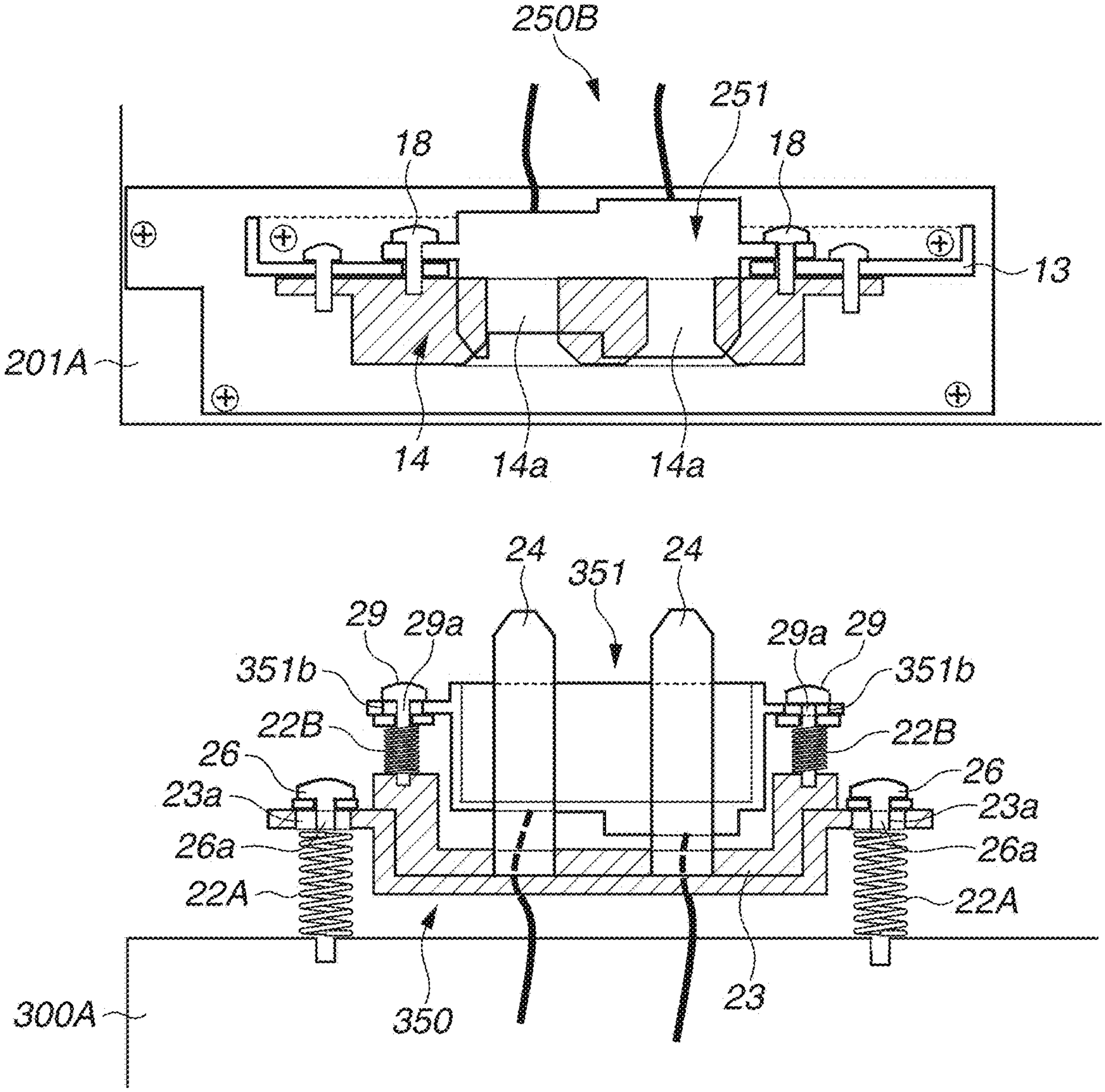
FIG. 13A is a schematic diagram illustrating a main body side connector unit and a unit side connector unit according to a third exemplary embodiment.
Figure 13B:
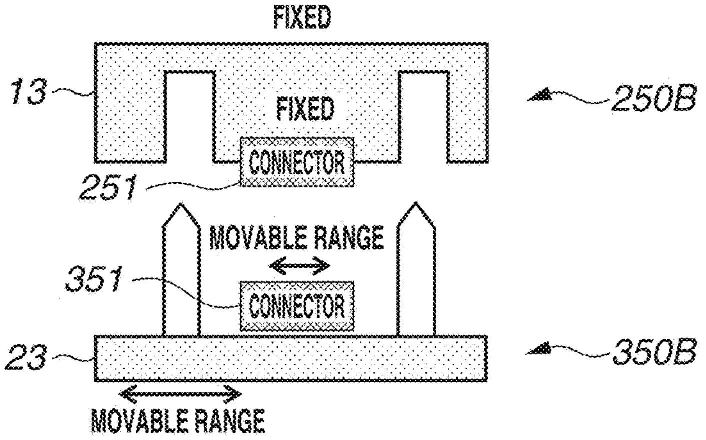
FIG. 13B is a schematic diagram illustrating movable ranges.

Next, a main body side connector unit and a unit side connector unit according to a third exemplary embodiment will be described with reference to FIGS. 13A and 13B. FIG. 13A is a schematic diagram illustrating a main body side connector unit and a unit side connector unit according to the third exemplary embodiment. FIG. 13B is a schematic diagram illustrating movable ranges of the main body side connector unit and the unit side connector unit according to the third exemplary embodiment. In the third exemplary embodiment, components similar to those in the above-described first and second exemplary embodiments are assigned the same reference numerals, and the description will be simplified or omitted.

In the first and second exemplary embodiments, in each connector unit, one of a terminal portion and a support portion is elastically supported, and a different one is fixed. In contrast to this, in the third exemplary embodiment, in a unit side connector unit, a terminal portion is provided on a support portion via an elastic member, and the support portion is provided on the casing 300A via an elastic member. In a main body side connector unit, both of a terminal portion and a support portion are fixed.

As illustrated in an upper part of FIG. 13A, in a main body side connector unit 250B (corresponding to the second connector unit), the main body side connector support portion 13 is fixed to the casing 201A, and the main body side terminal portion 251 is fixed to the main body side connector support portion 13 by a fixing screw 18. That is, the main body side connector support portion 13 and the main body side terminal portion 251 do not relatively move relative to the casing 201A.

On the other hand, as illustrated in a lower part of FIG. 13A, in the unit side connector unit 350 (corresponding to the first connector unit), the unit side connector support portion 23 is provided movably relative to the casing 300A by the stepped screw 26 and the coil spring 22A. The diameter of the screw through-hole 23*a* formed in the unit side connector support portion 23 is larger than the diameter of the shaft portion 26*a* of the stepped screw 26. Between the screw through-hole 23*a* and the shaft portion 26*a* of the stepped screw 26, a clearance gap is provided.

The unit side terminal portion 351 is provided movably relative to the unit side connector support portion 23 by the stepped screw 29 and a coil spring 22B. In the unit side terminal portion 351, a screw through-hole 351*b* through which the shaft portion 29*a* of the stepped screw 29 passes is formed. A diameter of the screw through-hole 351*b* is larger than the diameter of the shaft portion 29*a* of the stepped screw 29, and a clearance gap is provided between the screw through-hole 351*b* and the shaft portion 29*a* of the stepped screw 29.

In the present exemplary embodiment, as illustrated in FIG. 13B, the movable range of the unit side connector support portion 23 relative to the casing 300A is larger than the movable range of the unit side terminal portion 351 relative to the unit side connector support portion 23. To achieve this, as an example of a movable range regulation unit, the sizes of the screw through-holes 23*a* and 351*b* and the stepped screws 26 and 29 are adjusted in such a manner that the clearance gap between the screw through-hole 23*a* and the shaft portion 26*a* of the stepped screw 26 becomes larger than the clearance gap between the screw through-hole 351*b* and the shaft portion 29*a* of the stepped screw 29. It is also desirable that the biasing force of the coil springs 22A biasing the unit side connector support portion 23 is smaller than the biasing force of the coil springs 22 biasing the unit side terminal portion 351.

With this configuration, also in the third exemplary embodiment, effects similar to those of the first and second exemplary embodiments can be obtained. Specifically, in the third exemplary embodiment, when the casing 201A and the casing 300A are attached, the unit side connector support portion 23 can move drastically relative to the casing 300A, and therefore it becomes easier to locate the main body side connector support portion 13 and the unit side connector support portion 23 at positions where the guide pin 24 can be inserted into the guide hole 14*a*. In a state in which the guide pin 24 is inserted in the guide hole 14*a*, the unit side connector support portion 23 and the main body side connector support portion 13 do not relatively move, and only the unit side terminal portion 351 can move relative to the main body side terminal portion 251 fixed to the main body side connector support portion 13. This thereby obtains an effect of enabling the unit side terminal portion 351 and the main body side terminal portion 251 to be appropriately fitted with each other, which is an effect similar to that of the above-described first and second exemplary embodiments. In the third exemplary embodiment, the unit side connector support portion 23 may incline with respect to the casing 300A.

Figure 14A:
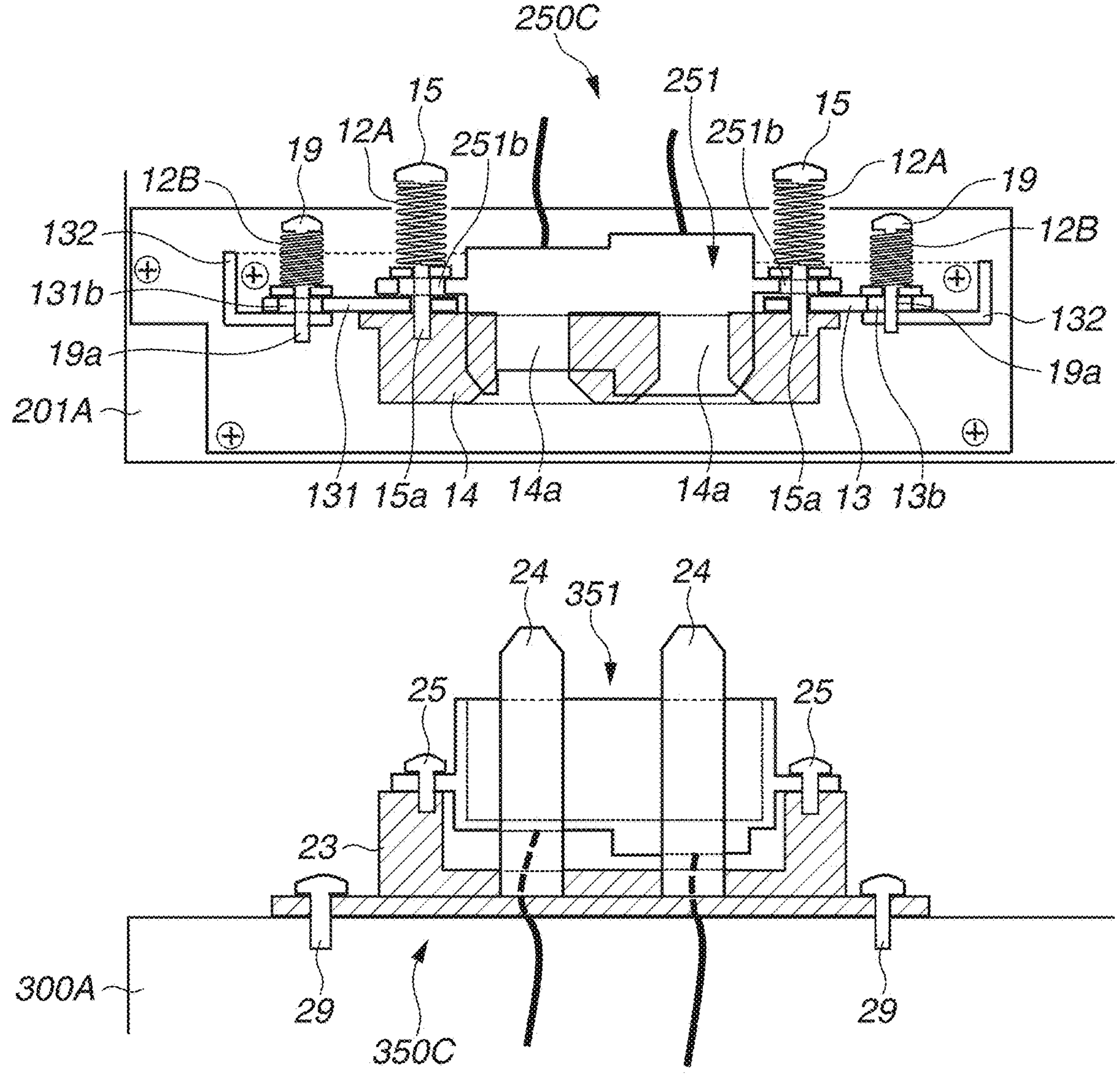
FIG. 14A is a schematic diagram illustrating a main body side connector unit and a unit side connector unit according to a second exemplary embodiment.
Figure 14B:
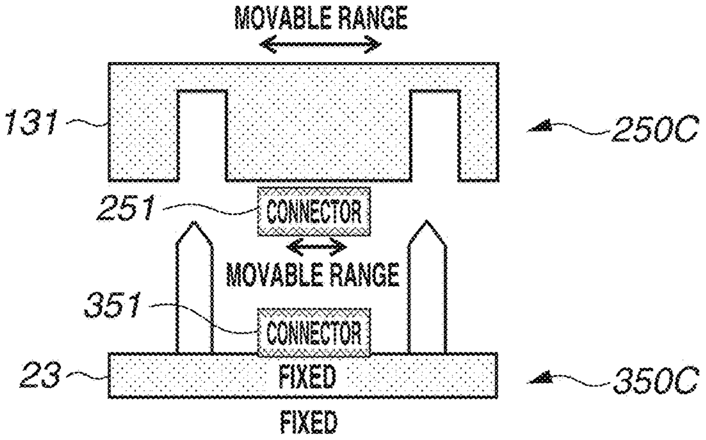
FIG. 14B is a schematic diagram illustrating movable ranges.

Next, a main body side connector unit and a unit side connector unit according to a fourth exemplary embodiment will be described with reference to FIGS. 14A and 14B. FIG. 14A is a schematic diagram illustrating a main body side connector unit and a unit side connector unit according to the fourth exemplary embodiment. FIG. 14B is a schematic diagram illustrating movable ranges of the main body side connector unit and the unit side connector unit according to the fourth exemplary embodiment. In the fourth exemplary embodiment, components similar to those in the above-described first and second exemplary embodiments are assigned the same reference numerals, and the description will be simplified or omitted.

In the first and second exemplary embodiments, in each connector unit, one of a terminal portion and a support portion is elastically supported, and a different one is fixed. In contrast to this, in the fourth exemplary embodiment, in a unit side connector unit, both of a terminal portion and a support portion are fixed. In a main body side connector unit, a terminal portion is provided on a support portion via an elastic member and the support portion is provided on the casing 201A via an elastic member.

As illustrated in an upper part of FIG. 14A, a main body side connector unit 250C (corresponding to the first connector unit) includes the main body side connector support portion 131 and the main body side terminal portion 251. The main body side connector support portion 131 is provided with the guide portion 14. The main body side connector support portion 131 is provided movably relative to a protruding support portion 132 protruding from the casing 201A, by the stepped screw 19 and a coil spring 12B. A diameter of a screw through-hole 131*b* formed in the main body side connector support portion 131 is larger than the diameter of the shaft portion 19*a* of the stepped screw 19. Between the screw through-hole 131*b* and the shaft portion 19*a* of the stepped screw 19, a clearance gap is provided.

The main body side terminal portion 251 is provided movably relative to the main body side connector support portion 131 by the stepped screws 15 and a coil spring 12A. In the main body side terminal portion 251, the screw through-hole 251*b* through which the shaft portions 15*a* of the stepped screws 15 passes is formed. The diameter of the screw through-hole 251*b* is larger than the diameter of the shaft portions 15*a* of the stepped screws 15. Between the screw through-hole 251*b* and the shaft portions 15*a* of the stepped screws 15, a clearance gap is provided.

On the other hand, as illustrated in a lower part of FIG. 14A, in the unit side connector unit 350C (corresponding to the second connector unit), the unit side connector support portion 23 is fixed to the casing 300A, and the unit side terminal portion 351 is fixed to the unit side connector support portion 23 via a fixing screw 25. That is, the unit side connector support portion 23 and the unit side terminal portion 351 do not relatively move relative to the casing 300A.

In the present exemplary embodiment, as illustrated in FIG. 14B, the movable range of the main body side connector support portion 131 relative to the casing 201A is larger than the movable range of the main body side terminal portion 251 relative to the main body side connector support portion 131. To achieve this, as an example of a movable range regulation unit, the sizes of the screw through-holes 131*b* and 251*b* and the stepped screws 19 and 15 are adjusted in such a manner that the clearance gap between the screw through-hole 131*b* and the shaft portion 19*a* of the stepped screw 19 becomes larger than the clearance gap between the screw through-hole 251*b* and the shaft portions 15*a* of the stepped screws 15. It is desirable that the biasing force of the coil springs 12B biasing the main body side connector support portion 131 is smaller than the biasing force of the coil springs 12A biasing the main body side terminal portion 251.

With this configuration, also in the fourth exemplary embodiment, effects similar to those in the first to third exemplary embodiments can be obtained. Specifically, in the fourth exemplary embodiment, when the casing 201A and the casing 300A are attached, the main body side connector support portion 131 can move drastically relative to the casing 201A, and therefore it becomes easy to locate the main body side connector support portion 131 and the unit side connector support portion 23 at positions where the guide pin 24 can be inserted into the guide hole 14*a*. In a state in which the guide pin 24 is inserted in the guide hole 14*a*, the unit side connector support portion 23 and the main body side connector support portion 131 do not relatively move, and only the main body side terminal portion 251 can move relative to the unit side terminal portion 351 fixed to the unit side connector support portion 23. An effect is thereby obtained of enabling the unit side terminal portion 351 and the main body side terminal portion 251 to be appropriately fitted with each other, which is an effect similar to that of the first exemplary embodiment. In the fourth exemplary embodiment, the main body side connector support portion 131 may incline with respect to the casing 201A.

In the above-described first to the fourth exemplary embodiments, the description has been given of an example case where the sheet storage device 300 is attached as an optional retrofit device below the image forming apparatus 201, but the example is not limited to this. For example, the present disclosure may be applied to a case where a sheet storage device of a different type is attached to the right surface of the image forming apparatus 201 as an optional device, or a case where a finisher device that performs punching processing of forming a hole in the sheet P and stapling processing of stapling a plurality of sheets P is attached to the left surface of the image forming apparatus 201.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-172274, filed Oct. 3, 2023, which is hereby incorporated by reference herein in its entirety.

What is claimed is:

1. An image forming apparatus configured to form an image on a recording material, the image forming apparatus comprising:

a first casing and a second casing that are attachable to and detachable from each other;

a first connector unit including a first terminal portion and a first support portion configured to support the first terminal portion;

a second connector unit including a second terminal portion electrically connected with the first terminal portion by being fitted with the first terminal portion in a first direction, and a second support portion configured to support the second terminal portion;

a first biasing member configured to bias the first support portion toward the second connector unit; and a second biasing member configured to bias the second terminal portion toward the first connector unit, wherein the first support portion is movable relative to the first casing, wherein the first terminal portion is fixed to the first support portion, wherein the second support portion is fixed to the second casing, wherein the second terminal portion is movable relative to the second support portion, and wherein a movable range of the first support portion relative to the first casing is larger than a movable range of the second terminal portion relative to the second support portion.

2. The image forming apparatus according to claim 1, wherein the first support portion includes a guide hole, and wherein the second support portion includes a positioning member inserted into the guide hole.

3. The image forming apparatus according to claim 1, wherein the second support portion includes a guide hole, and wherein the first support portion includes a positioning member inserted into the guide hole.

4. The image forming apparatus according to claim 1, wherein either one member of the first support portion and the first casing includes a shaft portion extending along the first direction, wherein a different member of the first support portion and the first casing includes a through-hole through which the shaft portion penetrates, wherein a clearance gap is provided between an edge of the through-hole and the shaft portion in such a manner as to make the first support portion movable relative to the first casing in a second direction intersecting with the first direction, and wherein the first support portion is inclinable with respect to the first casing.

5. The image forming apparatus according to claim 4, wherein the first biasing member includes a coil spring arranged around the shaft portion, wherein the shaft portion has a contact portion in contact with one end of the coil spring, and wherein the coil spring is provided between the different member and the contact portion.

6. The image forming apparatus according to claim 1, wherein either one member of the second terminal portion and the second support portion includes a shaft portion extending along the first direction, wherein a different member of the second terminal portion and the second support portion includes a through-hole through which the shaft portion penetrates, and wherein a clearance gap is provided between an edge of the through-hole and the shaft portion in such a manner as to make the second terminal portion movable relative to the second support portion in a second direction intersecting with the first direction.

7. The image forming apparatus according to claim 6, wherein the second biasing member includes a coil spring arranged around the shaft portion, wherein the shaft portion has a contact portion in contact with one end of the coil spring, and wherein the coil spring is provided between the different member and the contact portion.

8. The image forming apparatus according to claim 1, wherein the first support portion is movable relative to the first casing in a second direction intersecting with the first direction, wherein the second terminal portion is movable relative to the second support portion in the second direction, and wherein a movable range in the second direction of the first support portion relative to the first casing is larger than a movable range in the second direction of the second terminal portion relative to the second support portion.

9. An image forming apparatus configured to form an image on a recording material, the image forming apparatus comprising:

a first casing and a second casing that are attachable to and detachable from each other;

a first connector unit including a first terminal portion and a first support portion configured to support the first terminal portion; and a second connector unit including a second terminal portion electrically connected with the first terminal portion by being fitted with the first terminal portion in a first direction, and a second support portion configured to support the second terminal portion, wherein the first support portion is movable relative to the first casing in a second direction intersecting with the first direction, wherein the first terminal portion is movable relative to the first support portion in the second direction, wherein the second support portion is fixed to the second casing, wherein the second terminal portion is fixed to the second support portion, and wherein a movable range in the second direction of the first support portion relative to the first casing is larger than a movable range in the second direction of the first terminal portion relative to the first support portion.

10. The image forming apparatus according to claim 9, wherein the first support portion includes a guide hole, and wherein the second support portion includes a positioning member inserted into the guide hole.

11. The image forming apparatus according to claim 9, wherein the second support portion includes a guide hole, and wherein the first support portion includes a positioning member inserted into the guide hole.

12. The image forming apparatus according to claim 9, further comprising:

a first biasing member configured to bias the first support portion toward the second connector unit; and a second biasing member configured to bias the first terminal portion toward the second connector unit.

13. The image forming apparatus according to claim 12, wherein either one member of the first support portion and the first casing includes a shaft portion extending along the first direction, wherein a different member of the first support portion and the first casing includes a through-hole through which the shaft portion penetrates, wherein a clearance gap is provided between an edge of the through-hole and the shaft portion in such a manner as to make the first support portion movable relative to the first casing in the second direction, and wherein the first support portion is inclinable with respect to the first casing.

14. The image forming apparatus according to claim 13, wherein the first biasing member includes a coil spring arranged around the shaft portion, wherein the shaft portion has a contact portion in contact with one end of the coil spring, and wherein the coil spring is provided between the different member and the contact portion.

15. The image forming apparatus according to claim 12, wherein either one member of the first terminal portion and the first support portion includes a shaft portion extending along the first direction, wherein a different member of the first terminal portion and the first support portion includes a through-hole through which the shaft portion penetrates, and wherein a clearance gap is provided between an edge of the through-hole and the shaft portion in such a manner as to make the first support portion movable relative to the first support portion in the second direction.

16. The image forming apparatus according to claim 15, wherein the second biasing member includes a coil spring arranged around the shaft portion, wherein the shaft portion has a contact portion in contact with one end of the coil spring, and wherein the coil spring is provided between the different member and the contact portion.

17. The image forming apparatus according to claim 9, wherein the first support portion is movable relative to the first casing in the second direction, wherein the second terminal portion is movable relative to the second support portion in the second direction, and wherein a movable range in the second direction of the first support portion relative to the first casing is larger than a movable range in the second direction of the second terminal portion relative to the second support portion.

18. The image forming apparatus according to claim 1, wherein the first casing is attached below the second casing.

19. The image forming apparatus according to claim 18, further comprising:

an image forming unit provided in the second casing and configured to form the image on the recording material;

a storage member provided in the first casing and configured to store the recording material; and a conveyance unit provided in the first casing and configured to convey the recording material stored in the storage member from the first casing to the second casing.

* * * * *